(12) United States Patent
Suzuki

(10) Patent No.: US 10,069,648 B2
(45) Date of Patent: Sep. 4, 2018

(54) COMMUNICATION SYSTEM, CONTROL APPARATUS, COMMUNICATION CONTROL METHOD AND PROGRAM

(71) Applicant: NEC Corporation, Tokyo (JP)

(72) Inventor: Yoji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/120,391

(22) PCT Filed: Feb. 18, 2015

(86) PCT No.: PCT/JP2015/054380
§ 371 (c)(1),
(2) Date: Aug. 19, 2016

(87) PCT Pub. No.: WO2015/125804
PCT Pub. Date: Aug. 27, 2015

(65) Prior Publication Data
US 2017/0070364 A1    Mar. 9, 2017

(30) Foreign Application Priority Data

Feb. 19, 2014 (JP) .................................. 2014-029905

(51) Int. Cl.
*H04L 12/701* (2013.01)
*H04L 12/46* (2006.01)
(Continued)

(52) U.S. Cl.
CPC .......... *H04L 12/4641* (2013.01); *H04L 45/00* (2013.01); *H04L 45/02* (2013.01); *H04L 45/26* (2013.01)

(58) Field of Classification Search
CPC ......... H04L 45/00; H04L 45/02; H04L 45/04; H04L 45/64
See application file for complete search history.

(56) References Cited

U.S. PATENT DOCUMENTS 6,847,645 B1 * 1/2005 Potter .................... H04L 45/00
370/389
7,065,038 B1 * 6/2006 Brandt ..................... H04L 1/08
370/219

(Continued)

FOREIGN PATENT DOCUMENTS

EP    1806657 A1    7/2007
JP    2002-009829 A    1/2002

(Continued)

OTHER PUBLICATIONS

International Search Report corresponding to PCT/JP2015/054380, dated May 19, 2015 (5 pages).

(Continued)

*Primary Examiner* — Raj Jain
(74) *Attorney, Agent, or Firm* — Wilmer Cutler Pickering Hale and Dorr LLP

(57) ABSTRACT

A communication system comprises: a plurality of switches divided into a plurality of domains; a plurality of first control apparatuses that control a switch included in a corresponding domain; and a second control apparatus that controls the plurality of first control apparatuses. One first control apparatus corresponding to one domain out of the plurality of domains determines processing content on a packet of first communication between terminals accommodated by different switches included in the one domain based on a first database held by the one first control apparatus. The second control apparatus determines processing content on a packet of second communication between terminals accommodated by switches included in different domains out of the plurality of domains based on a second database held by the second control apparatus.

10 Claims, 14 Drawing Sheets

(51) Int. Cl.
*H04L 12/751* (2013.01)
*H04L 12/721* (2013.01)

(56) References Cited

U.S. PATENT DOCUMENTS

| | | | |
|---|---|---|---|
| 7,890,654 B1* | 2/2011 | Tadimeti | H04L 29/12424 370/399 |
| 7,971,089 B2 | 6/2011 | Yoshikawa et al. | |
| 8,830,835 B2 | 9/2014 | Casado et al. | |
| 8,964,767 B2 | 2/2015 | Koponen et al. | |
| 9,137,052 B2 | 9/2015 | Koponen et al. | |
| 9,209,998 B2 | 12/2015 | Casado et al. | |
| 9,288,081 B2 | 3/2016 | Casado et al. | |
| 9,444,651 B2 | 9/2016 | Koponen et al. | |
| 9,525,616 B2* | 12/2016 | Roessler | H04L 45/04 |
| 2007/0234116 A1* | 10/2007 | Yoshikawa | G06F 11/2007 714/13 |
| 2012/0039163 A1* | 2/2012 | Nakajima | H04L 41/0654 370/217 |
| 2013/0044641 A1 | 2/2013 | Koponen et al. | |
| 2013/0044751 A1 | 2/2013 | Casado et al. | |
| 2013/0044752 A1 | 2/2013 | Koponen et al. | |
| 2013/0044761 A1 | 2/2013 | Koponen et al. | |
| 2013/0044762 A1 | 2/2013 | Casado et al. | |
| 2013/0044763 A1 | 2/2013 | Koponen et al. | |
| 2013/0044764 A1 | 2/2013 | Casado et al. | |
| 2013/0064243 A1 | 3/2013 | Akiyoshi | |
| 2013/0142203 A1 | 6/2013 | Koponen et al. | |
| 2013/0329601 A1 | 12/2013 | Yin et al. | |
| 2014/0098820 A1* | 4/2014 | Anantharam | H04L 49/15 370/400 |
| 2014/0351396 A1* | 11/2014 | Stabile | H04L 41/044 709/223 |
| 2016/0315787 A1* | 10/2016 | Miyao | H04L 12/6418 |
| 2016/0344625 A1* | 11/2016 | Gao | H04L 12/6418 |
| 2017/0070364 A1* | 3/2017 | Suzuki | H04L 12/4641 |

FOREIGN PATENT DOCUMENTS

| | | |
|---|---|---|
| JP | 2010-199785 A | 9/2010 |
| JP | 2013-118699 A | 6/2013 |
| RU | 2477934 C1 | 3/2013 |
| WO | WO-2013/026050 A1 | 2/2013 |

OTHER PUBLICATIONS

Yuta Ashida et al., OpenFlow, "A Hierarchical Control Method with Domain Aggregation on OpenFlow Networks," The Institute of Electronics, Information and Communication Engineers (IEICE Technical Report), 2012 (8 pages).
Shohei Miyamoto et al., "Proposal of an OpenFlow Model Using Hierarchically Separated Control Plane and Network Partitioning," Information Processing Society of Japan and The Institute of Electronics, Information and Communication Engineers (IEICE), 2013 (8 pages).
Nick McKeown et al., "OpenFlow: Enabling Innovation in Campus Networks," Mar. 14, 2008 (6 pages).
OpenFlow Switch Specification, Version 1.3.1, Open Networking Foundation, Sep. 6, 2012 (128 pages).
Extended European Search Report issued by the European Patent Office for European Application No. 15752867.0 dated Sep. 20, 2017 (10 pages).
Russian Office Action issued by the Russia Patent Office for Russian Application No. 2016137124/08(058363) dated Nov. 14, 2017 (12 pages).
Tekalp, A. Murat, "Video Services over Software-Defined Networks," Retrieved online from URL:<https://tto.ku.edu.tr/sites/tto.ku.edu.tr/files/ICT-LEIT-SDN.pptx>, 25 pages (Dec. 6, 2013).
Zhao, Y., et al., "Experimental Demonstration of Hierarchical Controlled Software Defined Networking (HC-SDN) Deployed with PCE Protocol for Large Scale Multi-Domain Flexi-Grid Optical Networks," Asia Communications and Photonics Conference 2013, vol. AW4I.4, XP055405614, Washington, D.C., 4 pages (Nov. 15, 2013).

* cited by examiner

FIG.7
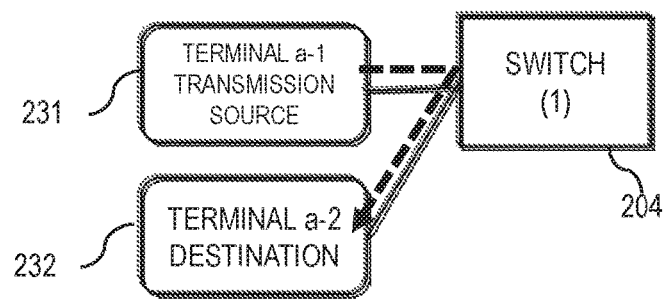
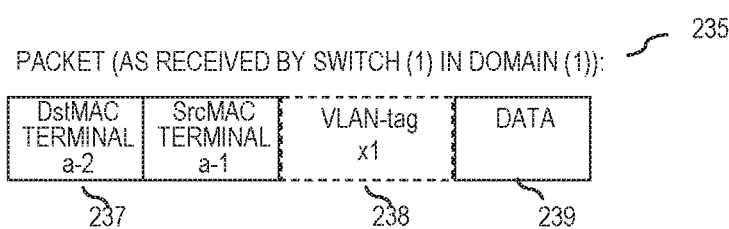
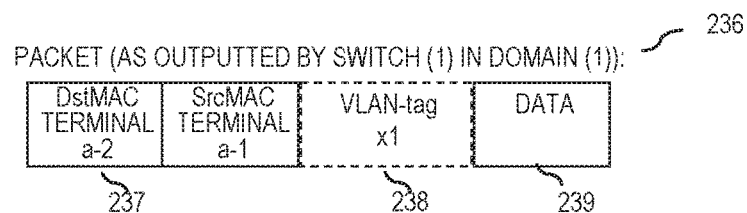

FIG. 14

PACKET (AS RECEIVED BY SWITCH (1) IN DOMAIN (1)): — 346

| DstMAC Router | SrcMAC TERMINAL a-1 | VLAN-tag x1 | SrcIP TERMINAL a-1 | DstIP TERMINAL b | DATA |
|---|---|---|---|---|---|

338, 337, 339

PACKET (AS OUTPUTTED BY SWITCH (1) IN DOMAIN (1)/AS RECEIVED BY SWITCH (3) IN DOMAIN (1)): — 347

| DstMAC SWITCH(3) | SrcMAC FIXED VALUE | VLAN-tag A | VLAN-tag B | MPLS Label DOMAIN(3) SWITCH(3) | SrcIP TERMINAL a-1 | DstIP TERMINAL b | DATA |
|---|---|---|---|---|---|---|---|

343, 345, 344, 337, 339

PACKET (AS OUTPUTTED BY SWITCH (3) IN DOMAIN (1)/AS RECEIVED BY SWITCH (1) IN DOMAIN (2)): — 348

| DstMAC DOMAIN(2) SWITCH(1) | SrcMAC FIXED VALUE | VLAN-tag A | VLAN-tag B | MPLS Label DOMAIN(3) SWITCH(3) | SrcIP TERMINAL a-1 | DstIP TERMINAL b | DATA |
|---|---|---|---|---|---|---|---|

353, 345, 344, 337, 339

PACKET (AS OUTPUTTED BY SWITCH (1) IN DOMAIN (2)/AS RECEIVED BY SWITCH (3) IN DOMAIN (2)): — 349

| DstMAC SWITCH(3) | SrcMAC FIXED VALUE | VLAN-tag A | VLAN-tag B | MPLS Label DOMAIN(3) SWITCH(3) | SrcIP TERMINAL a-1 | DstIP TERMINAL b | DATA |
|---|---|---|---|---|---|---|---|

343, 345, 344, 337, 339

PACKET (AS OUTPUTTED BY SWITCH (3) IN DOMAIN (2)/AS RECEIVED BY SWITCH (1) IN DOMAIN (3)): — 350

| DstMAC DOMAIN(3) SWITCH(1) | SrcMAC FIXED VALUE | VLAN-tag A | VLAN-tag B | MPLS Label DOMAIN(3) SWITCH(3) | SrcIP TERMINAL a-1 | DstIP TERMINAL b | DATA |
|---|---|---|---|---|---|---|---|

353, 345, 344, 337, 339

PACKET (AS OUTPUTTED BY SWITCH (1) IN DOMAIN (3)/AS RECEIVED BY SWITCH (3) IN DOMAIN (3)): — 351

| DstMAC SWITCH(3) | SrcMAC FIXED VALUE | VLAN-tag A | VLAN-tag B | MPLS Label DOMAIN(3) SWITCH(3) | SrcIP TERMINAL a-1 | DstIP TERMINAL b | DATA |
|---|---|---|---|---|---|---|---|

343, 345, 344, 337, 339

PACKET (AS OUTPUTTED BY SWITCH (3) IN DOMAIN (3)): — 352

| DstMAC TERMINAL b | SrcMAC Router | VLAN-tag y1 | SrcIP TERMINAL a-1 | DstIP TERMINAL b | DATA |
|---|---|---|---|---|---|

338, 337, 339

COMMUNICATION SYSTEM, CONTROL APPARATUS, COMMUNICATION CONTROL METHOD AND PROGRAM

REFERENCE TO RELATED APPLICATIONS

This application is a national stage application of International Application No. PCT/JP2015/054380, filed on Feb. 18, 2015, which claims the benefit of priority to Japanese patent application No. 2014-029905, filed on Feb. 19, 2014, the disclosures of each which are incorporated herein in their entirety by reference.

The present invention relates to a communication system, control apparatus, communication control method, and program, and particularly to a communication system, control apparatus, communication control method, and program based on a centrally controlled virtual network.

BACKGROUND

Non-Patent Literatures 1 and 2 describes OpenFlow that achieves a centralized control network. OpenFlow treats communication as an end-to-end flow and performs path control, failure recovery, load balancing, and optimization for each flow. An OpenFlow switch (OFS), specified in Non-Patent Literature 2, comprises a secure channel for communicating with an OpenFlow controller (OFC), and operates according to a flow table, an addition to or rewriting of which is suitably instructed by the OFC. In the flow table, a set of matching rules (Match Fields) to be matched against a packet header, flow statistics (Counters), and instructions defining the processing content is defined for each flow (refer to "5.2 Flow Table" in Non-Patent Literature 2).

For instance, upon receiving a packet, the OFS searches for an entry having a matching rule (refer to "5.3 Matching" in Non-Patent Literature 2) that matches the header information of the received packet in the flow table. When an entry matching the received packet is found as a result of the search, the OFS updates the flow statistics (Counters) and performs the processing content (packet transmission from a designated port, flooding, discard, etc.) written in the instruction field of the entry on the received packet. On the other hand, when no entry matching the received packet is found as a result of the search, the OFS transmits a request (packet-in message) to the OFC via a secure channel to set an entry, requesting control information for processing the received packet. The OFS receives a flow entry defining the processing content and updates the flow table. As described, the OFS forwards a packet using an entry stored in the flow table as control information.

Further, as a related technology, Patent Literature 1 describes a data transfer method in a multi-domain network in which a plurality of domains are connected.
Patent Literature 1:
Japanese Patent Kokai Publication No. JP-P2010-199785A
Non-Patent Literature 1:
Nick McKeown, et al. "OpenFlow: Enabling Innovation in Campus Networks," [online], [Searched on Feb. 14, 2014], the Internet <URL: http://www.openflow.org/documents/openflow-wp-latest.pdf>.
Non-Patent Literature 2:
"OpenFlow Switch Specification, Version 1.3.1 (Wire Protocol 0x04)," [online], [Searched on Feb. 14, 2014], the Internet <URL:https://www.opennetworking.org/images/stories/downloads/specification/openflow-spec-v1.3.1.pdf>.

SUMMARY

The disclosure of Patent Literature cited above is incorporated herein in its entirety by reference thereto. The following analysis is given by the present inventor.

In a large-scale virtual network in which many switches are centrally controlled, high performance (or a high specification) are demanded for both the controller (also referred to as "control apparatus" hereinafter) and the switches. In other words, the controller must have a high processing capacity in order to control the entire network. Meanwhile, the switches need to have a large amount of resources in order to communicate with the entire network.

Further, even when high specification switches and controller are provided, an increase in the network scale will cause limitations. In other words, there is a problem that the performance (or specifications) of the controller and the switches limit the network scale.

Further, according to the technology described in Patent Literature 1, since a boundary node (i.e., a switch provided on a domain boundary) in each domain does not have to process a header corresponding to each service housed inside the multi-domain network, the processing load on the node (switch) can be reduced. An increase in the scale of the network as described above, however, may not be addressed sufficiently just by reducing the processing load on some nodes (switches). Furthermore, the technology disclosed in Patent Literature 1 is not related to a centrally controlled communication network.

Therefore, there is a need in the art to avoid the limit on the network scale imposed by the performance of the switches and the controllers and realize a large-scale, centrally controlled virtual network.

According to a first aspect of the present invention, there is provided a communication system. The communication system comprises a plurality of switches divided into a plurality of domains. Further, the communication system comprises a plurality of first control apparatuses that control a switch(es) included in a corresponding domain out of the plurality of domains. Moreover, the communication system comprises a second control apparatus that controls the plurality of first control apparatuses. Here, one first control apparatus corresponding to one domain out of the plurality of domains determines processing content on a packet of first communication between terminals accommodated by different switches included in the one domain based on a first database held by the first control apparatus. Further, the second control apparatus determines processing content on a packet of second communication between terminals accommodated by switches included in different domains out of the plurality of domains based on a second database held by the second control apparatus.

According to a second aspect of the present invention, there is provided a control apparatus corresponding to one of a plurality of first control apparatuses in a communication system comprising a plurality of switches divided into a plurality of domains, the plurality of first control apparatuses, and a second control apparatus. The one first control apparatus determines processing content on a packet of first communication between terminals accommodated by different switches included in a domain corresponding to the one first control apparatus based on a first database held by the one first control apparatus, and is controlled by the second control apparatus. The second control apparatus determines processing content on a packet of second communication between terminals accommodated by switches included in different domains out of the plurality of domains based on a second database held by the second control apparatus, and controls the one first control apparatus based on the determined processing content.

According to a third aspect of the present invention, there is provided a second control apparatus provided in a communication system comprising a plurality of switches divided into a plurality of domains, and a plurality of first control apparatuses. The plurality of first control apparatuses control a switch(es) included in a corresponding domain out of the plurality of domains, and one first control apparatus corresponding to one domain out of the plurality of domains determines processing content on a packet of first communication between terminals accommodated by different switches included in the one domain based on a first database held by the one first control apparatus. Further, the second control apparatus determines processing content on a packet of second communication between terminals accommodated by switches included in different domains out of the plurality of domains based on a second database held by the second control apparatus, and controls the plurality of first control apparatuses based on the determined processing content.

According to a fourth aspect of the present invention, there is provided a communication control method in a communication system comprising a plurality of switches divided into a plurality of domains, a plurality of first control apparatuses, and a second control apparatus. The communication control method comprises, by the plurality of first control apparatuses, controlling a switch(es) included in a corresponding domain out of the plurality of domains. Further, the communication control method comprises, by the second control apparatus, controlling the plurality of first control apparatuses. Further, the communication control method comprises, by one first control apparatus corresponding to one domain out of the plurality of domains, determining processing content on a packet of first communication between terminals accommodated by different switches included in the one domain based on a first database held by the one first control apparatus. Further, the communication control method comprises, by the second control apparatus, determining processing content on a packet of second communication between terminals accommodated by switches included in different domains out of the plurality of domains based on a second database held by the second control apparatus.

According to a fifth aspect of the present invention, there is provided a communication control method by a control apparatus corresponding to one of a plurality of first control apparatuses in a communication system comprising a plurality of switches divided into a plurality of domains, the plurality of first control apparatuses, and a second control apparatus. The communication control method comprises, by the one first control apparatus, determining processing content on a packet of first communication between terminals accommodated by different switches included in a domain corresponding to the one first control apparatus based on a first database held by the one first control apparatus. Further, the communication control method comprises, by the one first control apparatus, being controlled by the second control apparatus. Further, the second control apparatus determines processing content on a packet of second communication between terminals accommodated by switches included in different domains out of the plurality of domains based on a second database held by the second control apparatus, and controls the one first control apparatus based on the determined processing content.

According to a sixth aspect of the present invention, there is provided a communication control method by a second control apparatus provided in a communication system comprising a plurality of switches divided into a plurality of domains, and a plurality of first control apparatuses. The communication control method comprises, by the second control apparatus, determining processing content on a packet of second communication between terminals accommodated by switches included in different domains out of the plurality of domains based on a second database held by the second control apparatus. Further, the communication control method comprising, by the second control apparatus, controlling the plurality of first control apparatuses based on the determined processing content. Further, the plurality of first control apparatuses control a switch(es) included in a corresponding domain out of the plurality of domains, and one first control apparatus corresponding to one domain out of the plurality of domains determines processing content on a packet of first communication between terminals accommodated by different switches included in the one domain based on a first database held by the one first control apparatus.

A program relating to a seventh aspect of the present invention causes a computer provided in a control apparatus corresponding to one of a plurality of first control apparatuses in a communication system comprising a plurality of switches divided into a plurality of domains, the plurality of first control apparatuses, and a second control apparatus to execute the following processes. The program causes the computer to execute determining processing content on a packet of first communication between terminals accommodated by different switches included in a domain corresponding to the one first control apparatus based on a first database held by the one first control apparatus. Further, the program causes the computer to execute being a controlled by the second control apparatus. Further, the second control apparatus determines processing content on a packet of second communication between terminals accommodated by switches included in different domains out of the plurality of domains based on a second database held by the second control apparatus, and controls the one first control apparatus based on the determined processing content.

A program relating to an eighth aspect of the present invention causes a computer provided in a second control apparatus in a communication system comprising a plurality of switches divided into a plurality of domains, and a plurality of first control apparatuses to execute the following processes. The program causes the computer to execute determining processing content on a packet of second communication between terminals accommodated by switches included in different domains out of the plurality of domains based on a second database held by the second control apparatus. Further, the program causes the computer to execute controlling the plurality of first control apparatuses based on the determined processing content. Further, the plurality of first control apparatuses control a switch(es) included in a corresponding domain out of the plurality of domains, and one first control apparatus corresponding to one domain out of the plurality of domains determines processing content on a packet of first communication between terminals accommodated by different switches included in the one domain based on a first database held by the one first control apparatus.

Further, the program may be provided as a program product stored in a non-transitory computer-readable storage medium.

The present invention provides the following advantage, but not restricted thereto. According to the communication system, control apparatus, communication control method, and program relating to the present invention, it becomes possible to realize a large-scale, centrally controlled virtual network while avoiding the limit on the network scale imposed by the performance of the switches and the controllers.

BRIEF DESCRIPTION OF THE DRAWINGS

FIG. 7 is a drawing for explaining communication within a switch in a communication system relating to a second exemplary embodiment.

FIG. 14 is a drawing for explaining communication between domains in the communication system relating to the third exemplary embodiment.

PREFERRED MODES

Figure 1:
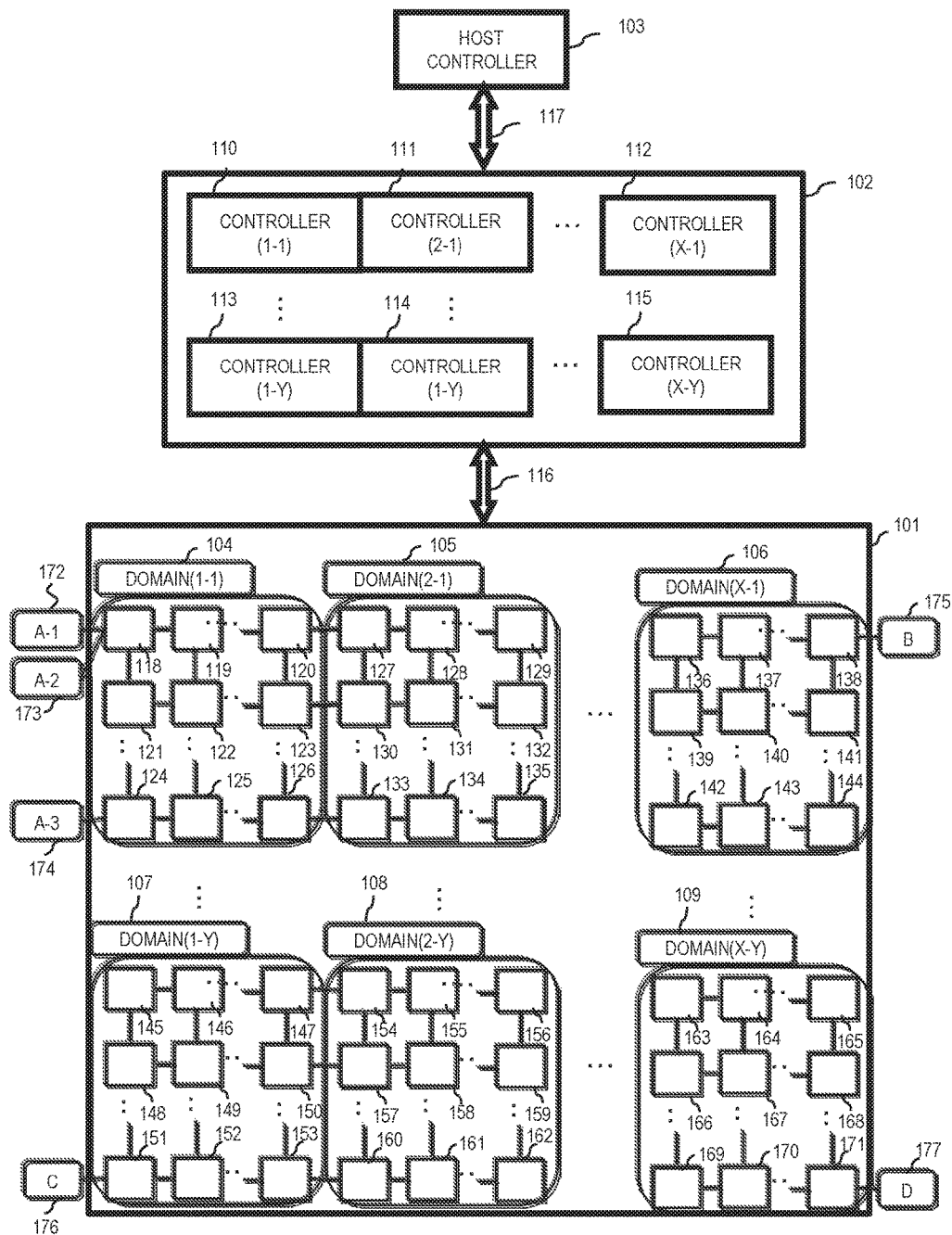
FIG. 1 is a drawing illustrating the configuration of a communication system relating to a first exemplary embodiment.

In the present disclosure, there are various possible modes, which include the following, but not restricted thereto. First, a summary of an exemplary embodiment will be given. Note that drawing reference signs in the summary are given solely to facilitate understanding and are not intended to limit the present invention to the modes shown in the drawings.

Figure 2:
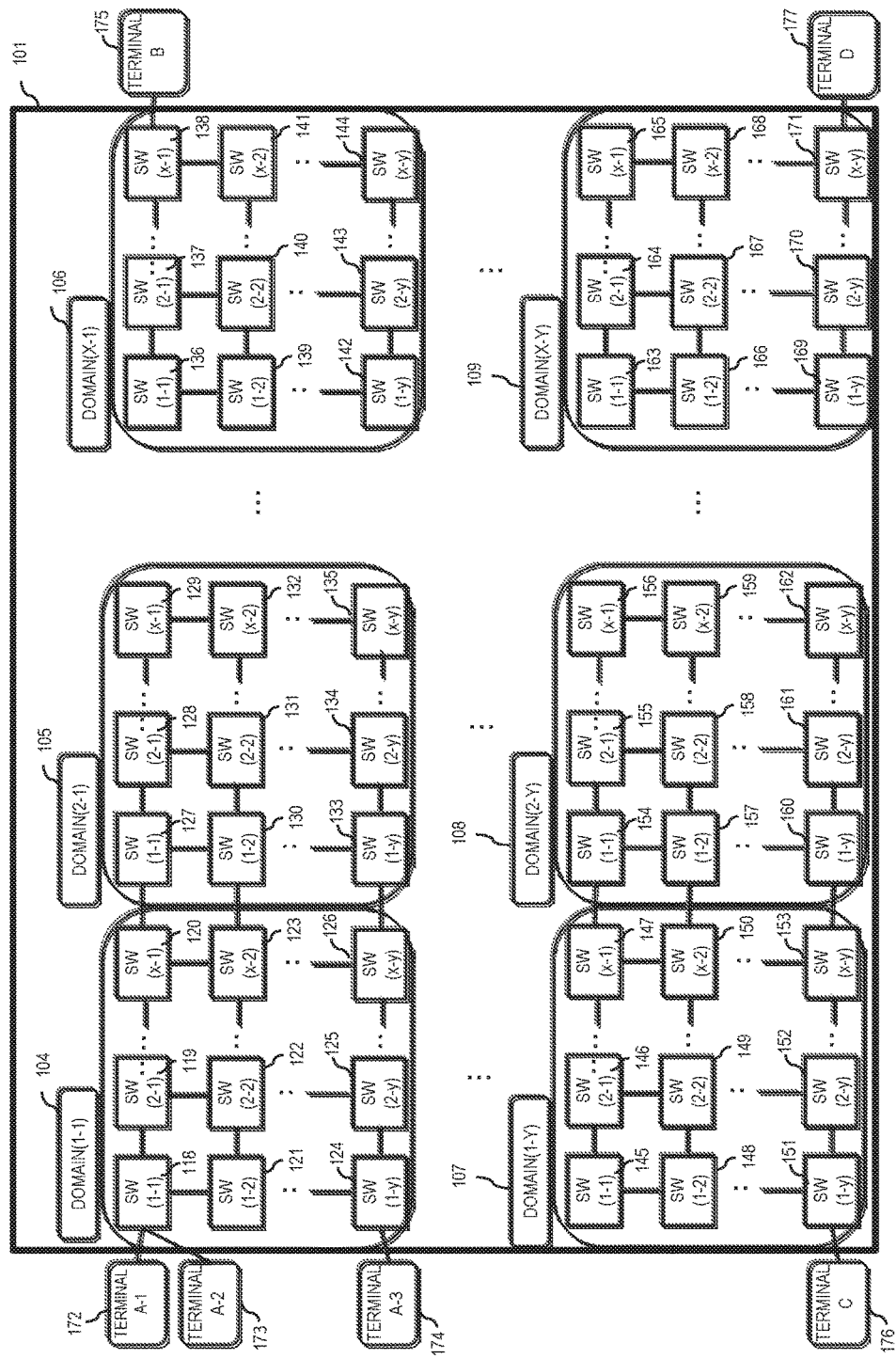
FIG. 2 is a drawing illustrating the configuration of a switch group in the communication system relating to the first exemplary embodiment.

FIGS. 1 and 2 are drawings illustrating a configuration of a communication system relating to an exemplary embodiment. In FIGS. 1 and 2, the communication system comprises a plurality of switches (118 to 171) divided into a plurality of domains (104 to 109), a plurality of first control apparatuses (controllers 110 to 115) that control a switch(es) included in a corresponding domain out of the plurality of domains, and a second control apparatus (a host (upper-ordinate) controller 103) that controls the plurality of first control apparatuses. Note that the switches are sometimes abbreviated to "SW" in the drawings.

Figure 3:
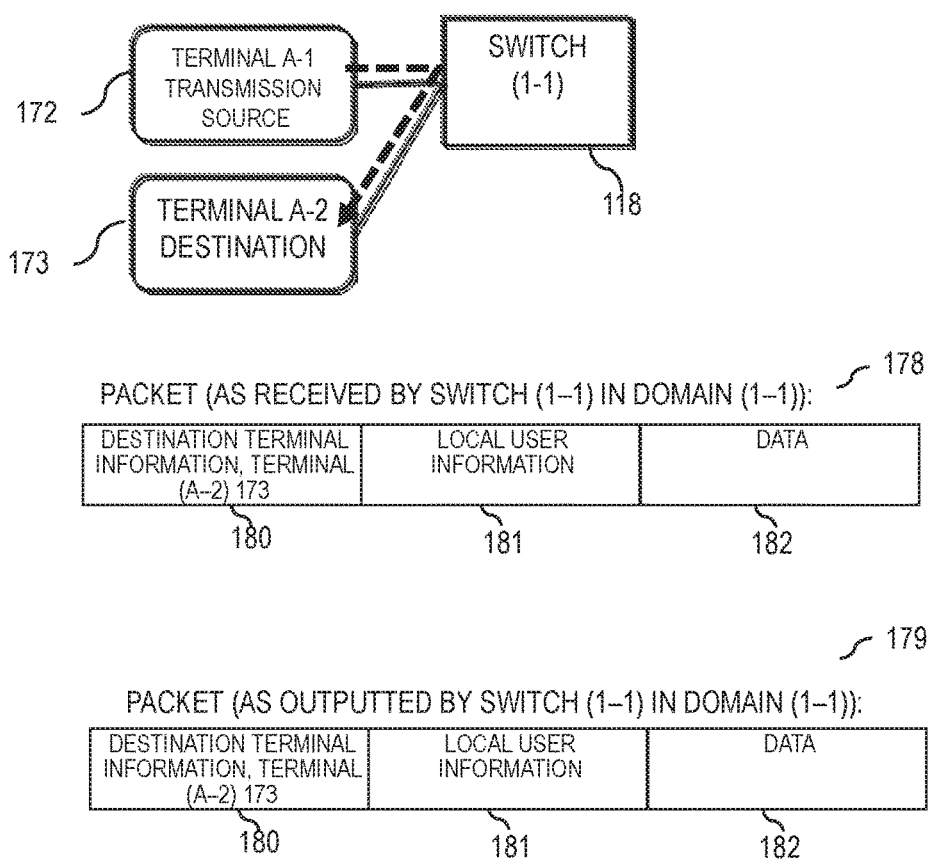
FIG. 3 is a drawing for explaining communication within a switch in the communication system relating to the first exemplary embodiment.

FIG. 3 shows a communication operation (referred to as "in-switch communication" hereinafter) between terminals accommodated by a single switch. In FIG. 3, processing content on the communication packet is determined based on a database held by the switch (118).

Figure 4:
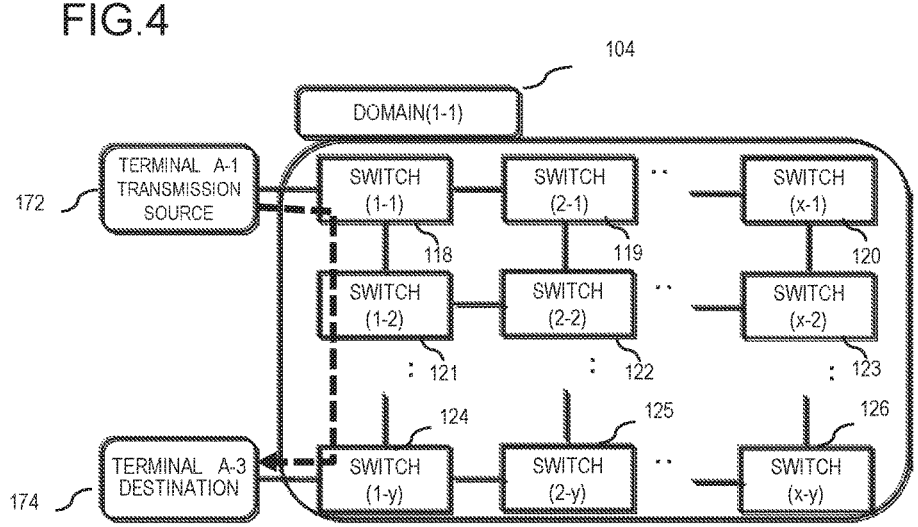
FIG. 4 is a drawing for explaining communication within a domain in the communication system relating to the first exemplary embodiment.

FIG. 4 shows a communication operation (referred to as "in-domain communication" hereinafter) between terminals accommodated by different switches included in a single domain. In FIG. 4, one first control apparatus (the controller 110) corresponding to one domain (for instance the domain 104) out of the plurality of domains determines processing content on a packet of first communication (the in-domain communication) between terminals (172 and 174) accommodated by different switches (for instance the switches 118 and 124) included in the one domain based on a first database held by the one first control apparatus (110).

Figure 5:
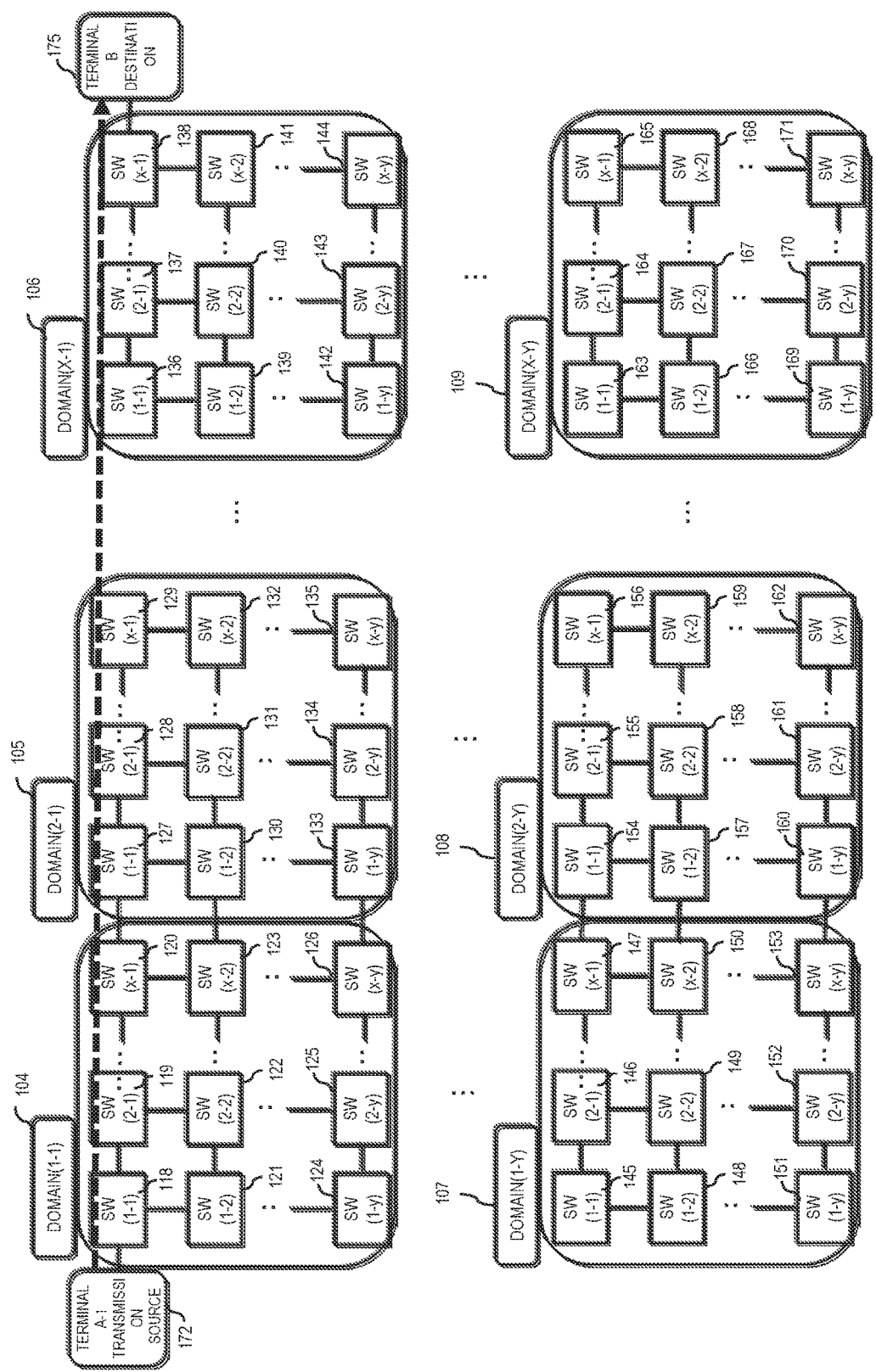
FIG. 5 is a drawing for explaining communication between domains in the communication system relating to the first exemplary embodiment.

FIG. 5 shows a communication operation (referred to as "inter-domain communication" hereinafter) between terminals accommodated by switches included in different domains. In FIG. 5, the second control apparatus (the host controller 103) determines processing content on a packet of second communication (referred to as "inter-domain communication" hereinafter) between terminals (172 and 175) accommodated by switches (for instance the switches 118 and 138) included in different domains (for instance the domains 104 and 106) out of the plurality of domains based on a second database held by the second control apparatus.

The operation of switches that accommodate a transmission terminal in the in-domain communication will be described with reference to FIG. 4. When a switch (118) that accommodates a transmission source terminal (172) receives a packet (183) from the transmission source terminal in the first communication (the in-domain communication), the one first control apparatus (110) corresponding to the one domain (104) refers to the first database using information (destination terminal information 180) included in the packet identifying a destination terminal and a first identifier (local user information 181) with which each switch identifies a user, determines processing content on the packet, and causes the switch (118) based on the determined processing content to add to the packet first information (destination switch information 187) identifying a switch (124) that accommodates the destination terminal (174) and second information (in-domain destination switch information 186) identifying a switch (124) corresponding to an exit of the packet in the one domain (104), and to change the first identifier (181) included in the packet to a second identifier (global user information 188) identifying the user in a network including the plurality of switches.

Next, an operation of relay switches (i.e., switches other than the switches provided at the entrance and the exit) in the in-domain communication will be described with reference to FIG. 4. When a switch (121), which is not the switch (118) that accommodates the transmission source terminal (172) or a switch (124) that accommodates the destination terminal (174) out of the switches (118, 121, and 124) on a forwarding path of the packet included in the domain (104), receives the packet in the first communication (the in-domain communication), the first control apparatus (110) corresponding to the domain (104) refers to the first database using the second information (the in-domain destination switch information 186), determines processing content on the packet, and causes the switch (121) based on the determined processing content to forward the packet.

Next, an operation of switches that accommodate a transmission terminal in the inter-domain communication will be described with reference to FIGS. 5 and 6. When a switch (118) that accommodates a transmission source terminal (172) receives a packet (189) from the transmission source terminal in the second communication (the inter-domain communication), the second control apparatus (the host controller 103) refers to the second database using information (the destination terminal information 180) included in the packet identifying a destination terminal and a first identifier (the local user information 181) with which each switch identifies a user, determines processing content on the packet, and causes the switch (118) based on the determined processing content to add to the packet (189) first information (the destination switch information 187) identifying a switch (138) that accommodates the destination terminal (175) and second information (the in-domain destination switch information 186) identifying a switch (120) corresponding to an exit of the packet in a domain (104) including the switch (118) that accommodates the transmission source terminal (172), and to change the first identifier (181) included in the packet to a second identifier (the global user information 188) identifying the user in a network including the plurality of switches.

Next, an operation of the switch provided at the exit of each domain in the inter-domain communication will be described with reference to FIGS. 5 and 6. When a switch (for instance the switch 120) that corresponds to an exit of a domain (for instance the domain 104) on a forwarding path of the packet receives the packet (190) in the second communication (the inter-domain communication), the second control apparatus (the host controller 103) refers to the second database using the information (the destination terminal information 180) identifying the destination terminal, determines processing content on the packet, and causes the switch (120) based on the determined processing content to delete the second information (the in-domain destination switch information 186) from the packet, and add to the packet (190) third information (domain boundary destination switch information 197) identifying a switch (127) that corresponds to an entrance of another domain (105) adjacent to the domain (104) on the forwarding path.

Next, an operation of the switch provided at the entrance of each domain in the inter-domain communication will be described with reference to FIGS. 5 and 6. When a switch (for instance the switch 127) that corresponds to an entrance of a domain (for instance the domain 105) on a forwarding path of the packet receives the packet (191) from another domain (104) adjacent to the domain (105) on the forwarding path in the second communication (the inter-domain communication), the second control apparatus (103) refers to the second database using the information (the destination terminal information 180) identifying the destination terminal, determines processing content on the packet (191), and causes the switch (127) based on the determined processing content to delete the third information (the domain boundary destination switch information 197) from the packet, and add to the packet (191) information identifying a switch (129) corresponding to an exit of the domain (105) as the second information.

Next, an operation of relay switches (i.e., switches other than the switches provided at the entrance and the exit) in the inter-domain communication will be described with reference to FIGS. 5 and 6. When a switch (119), which is not a switch (118) corresponding to an entrance of the packet or a switch (120) corresponding to an exit of the packet out of the switches (118, 119, and 120) on the forwarding path included in a domain (for instance the domain 104) on the forwarding path of the packet, receives the packet (190) in the second communication (the inter-domain communication), the first control apparatus (110) corresponding to the domain (104) refers to the first database using the second information (the in-domain destination switch information 186), determines processing content on the packet (190), and causes the switch (119) based on the determined processing content to forward the packet (190).

According to a communication system of an exemplary embodiment comprising the configuration described above, by controlling the switches (network switches) while dividing them into a plurality of domains, the processing load on the controller for each domain can be reduced. Further, communication is identified for each user and the packet format is converted at the entrance and the exit of the network. As a result, the resource consumption of the relay switches can be reduced while the number of users accommodated in the entire network is increased. Therefore, according to an exemplary embodiment, it becomes possible to realize a large-scale, centrally controlled virtual network while avoiding the limit on the network scale imposed by the performance (the specifications) of the switches and the controllers.

More concretely, according to an exemplary embodiment, by controlling physical switches while dividing them into a plurality of domains, it becomes possible to control a large-scale virtual network. This is because the processing load related to destination decisions can be distributed among processing nodes by determining destinations using the database of a switch in the in-switch communication, using the database of the controller for the domain in question in the in-domain communication, and using the database of the host controller in the inter-domain communication.

Further, according to an exemplary embodiment, it becomes possible to increase the number of users accommodated in a virtual network and realize a large-scale virtual network. This is because communication can be managed while virtually dividing the network by identifying communication at the entrance and the exit of the network with a combination of the destination terminal and user information, and the network as a whole can accommodate more users than the number of users accommodated by each switch by converting local user information into global user information at the entrance and the exit of the network.

Further, according to an exemplary embodiment, it becomes possible to realize a large-scale, virtual network while reducing the resource consumption of relay switches in the virtual network. The resource consumption of relay switches can be reduced by giving the in-domain destination switch information and the destination switch information to a packet at the entrance and the exit of the network, and relaying the packet using only the in-domain destination switch information within a domain and using only the destination switch information at a domain boundary.

(First Exemplary Embodiment)

Next, a communication system relating to a first exemplary embodiment will be described with reference to the drawings. FIG. 1 is a drawing showing the configuration of the communication system relating to the present exemplary embodiment. FIG. 2 is a drawing showing the configuration of a switch group in the communication system shown in FIG. 1.

In FIG. 1, the communication system of the present exemplary embodiment comprises terminals 172 to 177 connected to or accommodated by switches, switch group 101 that relays a packet between the terminals, a controller group 102 that controls the switch group 101, and a host (upper-ordinate) controller 103 that controls the controller group 102.

In FIG. 2, the switch group 101 includes the plurality of switches 118 to 171. The plurality of switches 118 to 171 are divided into the plurality of domains 104 to 109. The switches in each domain are controlled by a corresponding controller from the controllers 110 to 115 in the controller group 102. For instance, the plurality of switches 118 to 126 in the domain 104 are controlled by the controller 110. Note that, in the present invention, the number of switches and the network topology of the switches are not limited to the mode shown in FIG. 2.

The switches 118 to 171 are controlled by the controllers 110 to 115 via a switch control protocol 116. Further, the controller group 102 is controlled by the host controller 103. The controllers 110 to 115 are controlled by the host controller 103 via a controller control protocol 117.

In the in-switch communication, for instance, communication between the terminal (A-1) 172 and the terminal (A-2) 173 under the switch (1-1) 118, the destination is determined using the database held by the switch (1-1) 118.

Meanwhile, in the in-domain communication, for instance, communication between the terminal (A-1) 172 under the switch (1-1) 118 and the terminal (A-3) 174 under the switch (1-y) 124, the destination is determined using the database held by the controller (1-1) 110.

Further, in the inter-domain communication, for instance, communication between the terminal (A-1) 172 under the switch (1-1) 118 and the terminal B175 under the switch (x-1) 138, the destination is determined using the database held by the host controller 103.

The operation of the communication system (FIGS. 1 and 2) of the present exemplary embodiment will be described with reference to the drawings.

FIG. 3 is a drawing for explaining the operation of packet relay in the in-switch communication.

In FIG. 3, the switch (1-1) 118 receives a packet 178 from the terminal (A-1) 172. The switch (1-1) 118 refers to the destination terminal information 180/the local user information 181 of the packet 178 in the database held by the switch (1-1) 118 and determines an action (the content of processing on this packet).

In packets 178 and 179, the destination terminal information 180 is terminal information of the destination. Further, the local user information 181 is information for identifying a user within a switch. Data 182 is the actual data exchanged in the communication.

According to the determined action, the switch (1-1) 118 outputs the packet 179 to the terminal (A-2) 173. At this time, the format of the packet 179 is the same as that of the packet 178 when it was received by the switch (1-1) 118. In other words, packets are outputted by switches with their format unchanged in the in-switch communication.

FIG. 4 is a drawing for explaining the operation of packet relay in the in-domain communication.

In FIG. 4, the switch (1-1) 118 receives the packet 183 from the terminal (A-1) 172. The switch (1-1) 118 cannot determine an action even after referring to the destination terminal information 180/the local user information 181 of the packet 183 in the database held by the switch (1-1) 118. Therefore, the switch (1-1) 118 sends an inquiry about an action to the controller (1-1) 110 for the domain (1-1) 104 via the switch control protocol 116.

The controller (1-1) 110 refers to the destination terminal information 180/the local user information 181 of the packet 183 in the database held by the controller (1-1) 110 and determines an action. The controller (1-1) 110 notifies the switch (1-1) 118 of the determined action via the switch control protocol 116.

The switch (1-1) 118 converts the local user information 181 of the packet 183 into the global user information 188 according to the determined action. Further, according to the determined action, the switch (1-1) 118 gives the destination switch information 187 and the in-domain destination switch information 186 to the packet 183. Furthermore, the switch (1-1) 118 outputs the converted packet as a packet 184 to the switch (1-2) 121 according to the determined action.

In the packet 184, the global user information 188 is information for identifying a user within the network. Further, the destination switch information 187 indicates the switch to which the destination terminal belongs. Moreover, the in-domain destination switch information 186 indicates the exit switch to the destination terminal within the domain.

In the in-domain communication, the destination switch information 187 and the in-domain destination switch information 186 has the information of the switch (1-y) 124 in the same domain (1-1) 104.

Further, when the switch (1-1) 118 receives a second packet 183 or more, the switch (1-1) 118 does not send an inquiry to the controller (1-1) 110. In other words, when receiving the first packet 183, the switch (1-1) 118 holds the information notified by the controller (1-1) 110 and determines actions based on the held information thereafter.

The switch (1-2) 121 receives the packet 184 from the switch (1-1) 118. The switch (1-2) 121 cannot determine an action even after referring to the in-domain destination switch information 186 of the packet 184 in a database held by the switch (1-2) 121. Therefore, the switch (1-2) 121 sends an inquiry about an action to the controller (1-1) 110 for the domain (1-1) 104 via the switch control protocol 116.

The controller (1-1) 110 refers to the in-domain destination switch information 186 of the packet 184 in the database held by the controller (1-1) 110 and determines an action. The controller (1-1) 110 notifies the switch (1-2) 121 of the determined action via the switch control protocol 116.

According to the determined action, the switch (1-2) 121 outputs the packet 184 to a adjacent switch. At this time, the format of the packet 184 is the same as that of the packet 184 received by the switch (1-2) 121. In other words, packets are relayed without changing the format in the in-domain communication.

Further, in the operation of the switch (1-2) 121 described above, an inquiry is sent to the controller (1-1) 110 for the sake of simplicity. The controller (1-1) 110 may, however, set for each switch actions necessary for relaying packets between the switches in advance when it grasps the network configuration of the domain (1-1) 104. In this case, when receiving the first packet 184, the switch (1-2) 121 does not need to send an inquiry to the controller (1-1) 110.

The switch (1-y) 124 receives the packet 184 from an adjacent switch. The switch (1-y) 124 cannot determine an action even after referring to the destination switch information 187/the destination terminal information 180/the global user information 188 of the packet 184 in a database held by the switch (1-y) 124. Therefore, the switch (1-y) 124 sends an inquiry about an action to the controller (1-1) 110 for the domain (1-1) 104 via the switch control protocol 116.

The controller (1-1) 110 refers to the destination terminal information 180/the global user information 188 of the packet 184 in the database held by the controller (1-1) 110 and determines an action. The controller (1-1) 110 notifies the switch (1-y) 124 of the determined action via the switch control protocol 116.

The switch (1-y) 124 converts the global user information 188 of the packet 184 into the local user information 180 according to the determined action. Further, according to the determined action, the switch (1-y) 124 deletes the destination switch information 187 and the in-domain destination switch information 186 from the packet 184. Furthermore, the switch (1-y) 124 outputs the converted packet as a packet 185 to the terminal (A-3) 174 according to the determined action.

Further, when the switch (1-y) 124 receives a second packet 184 or more, the switch (1-y) 124 does not send an inquiry to the controller (1-1) 110. In other words, when receiving the first packet 184, the switch (1-y) 124 holds the information notified by the controller (1-1) 110 and determines actions based on the held information thereafter.

Figure 6:
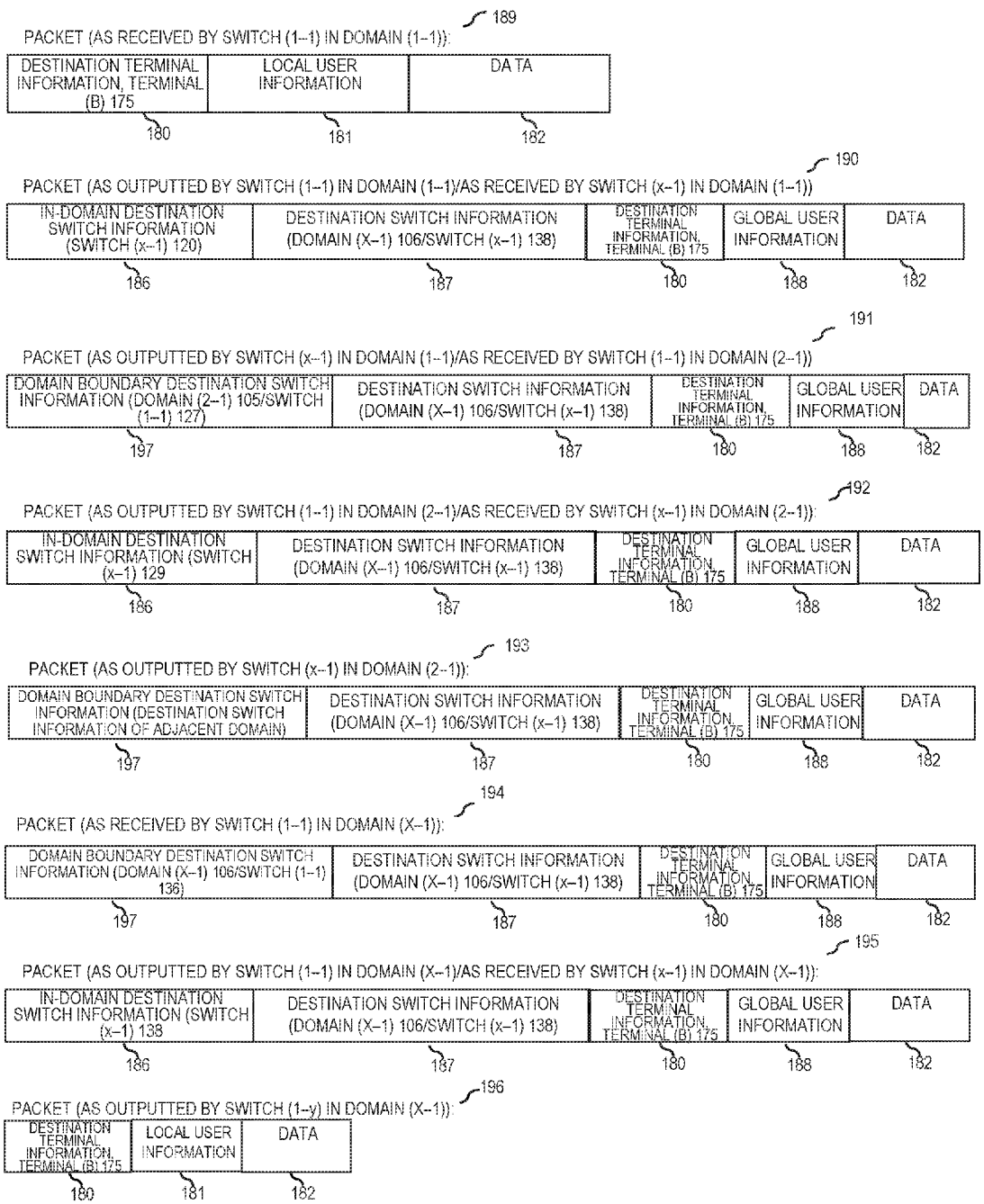
FIG. 6 is a drawing for explaining communication between domains in the communication system relating to the first exemplary embodiment.

FIGS. 5 and 6 are drawings for explaining the operation of packet relay in the inter-domain communication.

In FIG. 5, the switch (1-1) 118 receives a packet 189 from the terminal (A-1) 172. The switch (1-1) 118 cannot determine an action even after referring to the destination terminal information 180/the local user information 181 of the packet 189 in the database held by the switch (1-1) 118. Therefore, the switch (1-1) 118 sends an inquiry about an action to the controller (1-1) 110 for the domain (1-1) 104 via the switch control protocol 116.

The controller (1-1) 110 cannot determine an action even after referring to the destination terminal information 180/the local user information 181 of the packet 189 in the database held by the controller (1-1) 110. Therefore, the controller (1-1) 110 sends an inquiry about an action to the host controller 103 via the controller control protocol 117.

The host controller 103 refers to the destination terminal information 180/the local user information 181 of the packet 189 in the database held by the host controller 103 and determines an action. The host controller 103 notifies the controller (1-1) 110 of the determined action via the controller control protocol 117.

The controller (1-1) 110 notifies the switch (1-1) 118 of the notified action via the switch control protocol 116.

In FIG. 6, the switch (1-1) 118 converts the local user information 181 of the packet 189 into the global user information 188 according to the determined action. Further, according to the determined action, the switch (1-1) 118 gives the destination switch information 187 and the in-domain destination switch information 186 to the packet 189. Furthermore, the switch (1-1) 118 outputs the converted packet as a packet 190 to the switch (2-1) 119 according to the determined action.

In the inter-domain communication, the destination switch information 187 of the packet 190 has the information of the switch (x-1) 138 in the domain (X-1) 106, and the in-domain destination switch information 186 has the information of the switch (x-1) 120 in the domain (1-1) 104.

Further, when the switch (1-1) 118 receives a second packet 190 or more, the switch (1-1) 118 does not send an inquiry to the host controller 103. In other words, when receiving the first packet 190, the switch (1-1) 118 holds the information notified by the host controller 103 and determines actions based on the held information thereafter.

The switch (2-1) 119 receives the packet 190 from the switch (1-1) 118. The switch (2-1) 119 cannot determine an action even after referring to the in-domain destination switch information 186 of the packet 190 in a database held by the switch (2-1) 119. Therefore, the switch (2-1) 119 sends an inquiry about an action to the controller (1-1) 110 for the domain (1-1) 104 via the switch control protocol 116.

The controller (1-1) 110 refers to the in-domain destination switch information 186 of the packet 190 in the database held by the controller (1-1) 110 and determines an action. The controller (1-1) 110 notifies the switch (2-1) 119 of the determined action via the switch control protocol 116.

According to the determined action, the switch (2-1) 119 outputs the packet 190 to a adjacent switch. At this time, the format of the packet 190 is the same as that of the packet 190 received by the switch (2-1) 119. In other words, packets are relayed without changing the format in the in-domain communication.

Further, in the operation of the switch (2-1) 119 described above, an inquiry is sent to the controller (1-1) 110 for the sake of simplicity. The controller (1-1) 110 may, however, set for each switch actions necessary for relaying packets between the switches in advance when it grasps the network configuration of the domain (1-1) 104. In this case, when receiving the first packet 190, the switch (2-1) 119 does not need to send an inquiry to the controller (1-1) 110.

The switch (x-1) 120 receives the packet 190 from an adjacent switch. The switch (x-1) 120 cannot determine an action even after referring to the destination switch information 187 of the packet 190 in a database held by the switch (x-1) 120. Therefore, the switch (x-1) 120 sends an inquiry about an action to the controller (1-1) 110 for the domain (1-1) 104 via the switch control protocol 116.

The controller (1-1) 110 cannot determine an action even after referring to the destination switch information 187 of the packet 190 in the database held by the controller (1-1) 110. Therefore, the controller (1-1) 110 sends an inquiry about an action to the host controller 103 via the controller control protocol 117.

The host controller 103 refers to the destination switch information 187 of the packet 190 in the database held by the host controller 103 and determines an action. The host controller 103 notifies the controller (1-1) 110 of the determined action via the controller control protocol 117.

The controller (1-1) 110 notifies the switch (x-1) 120 of the notified action via the switch control protocol 116.

The switch (x-1) 120 converts the in-domain destination switch information 186 of the packet 190 into the domain boundary destination switch information 197 according to the determined action. Further, the switch (x-1) 120 outputs the converted packet as a packet 191 to the switch (1-1) 127 according to the determined action. The domain boundary destination switch information 197 of the packet 191 is information of the exit switch on a domain boundary to the destination terminal.

Further, in the operation of the switch (x-1) 120 described above, an inquiry is sent to the host controller 103 for the sake of simplicity. The host controller 103 may, however, set for each switch actions necessary for relaying packets between the switches in different domains in advance when it grasps the network configuration. In this case, when receiving the first packet 190, the switch (x-1) 120 does not need to send an inquiry to the controller (1-1) 110.

The switch (1-1) 127 receives the packet 191 from the switch (x-1) 120. The switch (1-1) 127 cannot determine an action even after referring to the destination switch information 187 of the packet 191 in a database held by the switch (1-1) 127. Therefore, the switch (1-1) 127 sends an inquiry to a controller (2-1) 111 for the domain (2-1) 105 via the switch control protocol 116.

The controller (2-1) 111 cannot determine an action even after referring to the destination switch information 187 of the packet 191 in a database held by the controller (2-1) 111. Therefore, the controller (2-1) 111 sends an inquiry about an action to the host controller 103 via the controller control protocol 117.

The host controller 103 refers to the destination switch information 187 of the packet 191 in the database held by the host controller 103 and determines an action. The host controller 103 notifies the controller (2-1) 111 of the determined action via the controller control protocol 117.

The controller (2-1) 111 notifies the switch (1-1) 127 of the notified action via the switch control protocol 116.

The switch (1-1) 127 converts the domain boundary destination switch information 197 of the packet 191 into the in-domain destination switch information 186 according to the determined action. Further, the switch (1-1) 127 outputs the converted packet as a packet 192 to a switch (2-1) 128 according to the determined action.

Further, in the operation of the switch (1-1) 127 described above, an inquiry is sent to the host controller 103 for the sake of simplicity. The host controller 103 may, however, set for each switch actions necessary for relaying packets between the switches in different domains in advance when it grasps the network configuration. In this case, when receiving the first packet 191, the switch (1-1) 127 does not need to send an inquiry to the host controller 103.

The switch (2-1) 128 receives the packet 192 from the switch (1-1) 127. The switch (2-1) 128 cannot determine an action even after referring to the in-domain destination switch information 186 of the packet 192 in a database held by the switch (2-1) 128. Therefore, the switch (2-1) 128 sends an inquiry about an action to the controller (2-1) 111 for the domain (2-1) 105 via the switch control protocol 116.

The controller (2-1) 111 refers to the in-domain destination switch information 186 of the packet 192 in the database held by the controller (2-1) 111 and determines an action. The controller (2-1) 111 notifies the switch (2-1) 128 of the determined action via the switch control protocol 116.

According to the determined action, the switch (2-1) 128 outputs the packet 192 to a adjacent switch. At this time, the format of the packet 192 is the same as that of the packet 192 received by the switch (2-1) 128. In other words, packets are relayed without changing the format in the in-domain communication.

Further, in the operation of the switch (2-1) 128 described above, an inquiry is sent to the controller (2-1) 111 for the sake of simplicity. The controller (2-1) 111 may, however, set for each switch actions necessary for relaying packets between the switches in advance when it grasps the network configuration of the domain (2-1) 105. In this case, when receiving the first packet 192, the switch (2-1) 128 does not need to send an inquiry to the controller (2-1) 111.

The switch (x-1) 129 receives the packet 192 from an adjacent switch. The switch (x-1) 129 cannot determine an action even after referring to the destination switch information 187 of the packet 192 in a database held by the switch (x-1) 129. Therefore, the switch (x-1) 129 sends an inquiry to the controller (2-1) 111 for the domain (2-1) 105 via the switch control protocol 116.

The controller (2-1) 111 cannot determine an action even after referring to the destination switch information 187 of the packet 192 in the database held by the controller (2-1) 111. Therefore, the controller (2-1) 111 sends an inquiry about an action to the host controller 103 via the controller control protocol 117.

The host controller 103 refers to the destination switch information 187 of the packet 192 in the database held by the host controller 103 and determines an action. The host controller 103 notifies the controller (2-1) 111 of the determined action via the controller control protocol 117.

The controller (2-1) 111 notifies the switch (x-1) 129 of the notified action via the switch control protocol 116.

The switch (x-1) 129 converts the in-domain destination switch information 186 of the packet 192 into the domain boundary destination switch information 197 according to the determined action. Further, the switch (x-1) 129 outputs the converted packet as a packet 193 to an adjacent switch according to the determined action.

Further, in the operation of the switch (x-1) 129 described above, an inquiry is sent to the host controller 103 for the sake of simplicity. The host controller 103 may, however, set for each switch actions necessary for relaying packets between the switches in different domains in advance when it grasps the network configuration. In this case, when receiving the first packet 192, the switch (x-1) 129 does not need to send an inquiry to the controller (2-1) 111.

A switch (1-1) 136 receives a packet 194 from an adjacent switch. The switch (1-1) 136 cannot determine an action even after referring to the destination switch information 187 of the packet 194 in a database held by the switch (1-1) 136. Therefore, the switch (1-1) 136 sends an inquiry about an action to a controller (X-1) 112 for the domain (X-1) 106 via the switch control protocol 116.

The controller (X-1) 112 cannot determine an action even after referring to the destination switch information 187 of the packet 194 in a database held by the controller (X-1) 112. Therefore, the controller (X-1) 112 sends an inquiry about an action to the host controller 103 via the controller control protocol 117.

The host controller 103 refers to the destination switch information 187 of the packet 194 in the database held by the host controller 103 and determines an action. The host controller 103 notifies the controller (X-1) 112 of the determined action via the controller control protocol 117.

The controller (X-1) 112 notifies the switch (1-1) 136 of the notified action via the switch control protocol 116.

The switch (1-1) 136 converts the domain boundary destination switch information 197 of the packet 194 into the in-domain destination switch information 186 according to the determined action. Further, the switch (1-1) 136 outputs the converted packet as a packet 195 to a switch (2-1) 137 according to the determined action.

In the communication of an exit domain, the destination switch information 187 and the in-domain destination switch information 186 have the information of the switch (x-1) 138 in the same domain (X-1) 106.

Further, in the operation of the switch (1-1) 136 described above, an inquiry is sent to the host controller 103 for the sake of simplicity. The host controller 103 may, however, set for each switch actions necessary for relaying packets between the switches in different domains in advance when it grasps the network configuration. In this case, when receiving the first packet 194, the switch (1-1) 136 does not need to send an inquiry to the host controller 103.

The switch (2-1) 137 receives the packet 195 from the switch (1-1) 136. The switch (2-1) 137 cannot determine an action even after referring to the in-domain destination switch information 186 of the packet 195 in a database held by the switch (2-1) 137. Therefore, the switch (2-1) 137 sends an inquiry about an action to the controller (X-1) 112 for the domain (X-1) 106 via the switch control protocol 116.

The controller (X-1) 112 refers to the in-domain destination switch information 186 of the packet 195 in the database held by the controller (X-1) 112 and determines an action. The controller (X-1) 112 notifies the switch (2-1) 137 of the determined action via the switch control protocol 116.

According to the determined action, the switch (2-1) 137 outputs the packet 195 to a adjacent switch. At this time, the format of the packet 195 is the same as that of the packet 195 received by the switch (2-1) 137. In other words, packets are relayed without changing the format in the in-domain communication.

Further, in the operation of the switch (2-1) 137 described above, an inquiry is sent to the controller (X-1) 112 for the sake of simplicity. The controller (X-1) 112 may, however, set for each switch actions necessary for relaying packets between the switches in advance when it grasps the network configuration of the domain (X-1) 106. In this case, when receiving the first packet 195, the switch (2-1) 137 does not need to send an inquiry to the controller (X-1) 112.

The switch (x-1) 138 receives the packet 195 from an adjacent switch. The switch (x-1) 138 cannot determine an action even after referring to the destination switch information 187/the destination terminal information 180/the global user information 188 of the packet 195 in a database held by the switch (x-1) 138. Therefore, the switch (x-1) 138 sends an inquiry about an action to the controller (X-1) 112 for the domain (X-1) 106 via the switch control protocol 116.

The controller (X-1) 112 refers to the destination terminal information 180/the global user information 188 of the packet 195 in the database held by the controller (X-1) 112 and determines an action. The controller (X-1) 112 notifies the switch (x-1) 138 of the determined action via the switch control protocol 116.

The switch (x-1) 138 converts the global user information 188 of the packet 195 into the local user information 181 according to the determined action. Further, the switch (x-1) 138 deletes the destination switch information 187 and the in-domain destination switch information 186 from the packet 195 according to the determined action. Furthermore, the switch (x-1) 138 outputs the converted packet as a packet 196 to the terminal B175 according to the determined action.

Further, when the switch (x-1) 138 receives a second packet 196 or more, the switch (x-1) 138 does not send an inquiry to the controller (X-1) 112. When receiving the first packet 196, the switch (x-1) 138 holds the information notified by the controller (X-1) 112 and determines actions based on the held information thereafter.

In the communication system of the present exemplary embodiment, communication is identified with a combination of "the destination terminal information 180 and the local user information 181" or "the destination terminal information 180 and the global user information 188" only at the entrance and the exit of the network in any of the operations shown in FIGS. 3 to 6. For instance, communication with {user information: 1/destination terminal A} and communication with {user information: 2/destination terminal A} are identified as separate pieces of communication.

Further, the packet relay operation is performed inside the network using only the in-domain destination switch information 186 and the destination switch information 187. At this time, for instance, communication addressed to a switch X in a virtual network 1 and communication addressed to the switch X in a virtual network 2 can be managed together.

In other words, according to the communication system of the present exemplary embodiment, the resource consumption of relay switches can be reduced by managing communication while virtually dividing a network, and collectively managing the relay operation of these virtual networks inside the network.

Further, according to the communication system of the present exemplary embodiment, the number of users greater than the accommodation conditions of a single switch can be accommodated by the entire network by converting between the local user information 181 and the global user information 188 at the entrance and the exit of the network. For instance, where the number of pieces of the local user information 181 accommodated by a switch is X, the number of pieces of the global user information 188 accommodated by the entire network can be Y ($X \leq Y$).

(Second Exemplary Embodiment)

Next, a communication system relating to a second exemplary embodiment will be described with reference to the drawings. The communication system of the present exemplary embodiment is configured identically to the communication system (FIG. 1) of the first exemplary embodiment. Note, however, that the information required to relay packets has been notified to the switch group 101 by the controller group 102 and the host controller 103 in the present exemplary embodiment.

FIG. 7 is a drawing for explaining an example of packet relay operation in the in-switch communication.

In FIG. 7, a switch (1) 204 receives a packet 235 from a terminal (a-1) 231. The switch (1) 204 refers to destination terminal information 237/local user information 238 of the packet 235 in a database held by the switch (1) 204 and determines an action.

The destination terminal information 237 of the packet 235 is Dst MAC address information indicating a terminal (a-2) 232. Further, the local user information 238 is the information of a VLAN_ID (Virtual Local Area Network Identifier) to which the terminal (a-1) 231 and the terminal (a-2) 232 belong. Moreover, data 239 is the actual data exchanged in the communication.

According to the determined action, the switch (1) 204 outputs the packet 235 as a packet 236 to the terminal (a-2) 232. At this time, the format of the packet 236 is the same as that of the packet 235 when it was received by the switch (1) 204. In other words, packets are outputted with the format unchanged in the in-switch communication.

Figure 8:
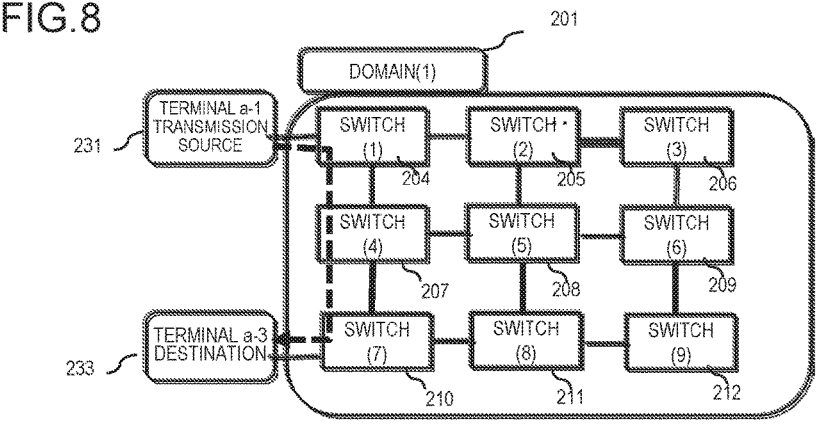
FIG. 8 is a drawing for explaining communication within a domain in the communication system relating to the second exemplary embodiment.

FIG. 8 is a drawing for explaining the operation of packet relay in the in-domain communication.

In FIG. 8, the switch (1) 204 receives a packet 240 from the terminal (a-1) 231. The switch (1) 204 refers to the destination terminal information 237/the local user information 238 of the packet 240 in the database held by the switch (1) 204 and determines an action.

The switch (1) 204 converts the local user information 238 into global user information 245, for instance, by QinQ conversion, according to the determined action. Further, the switch (1) 204 gives destination switch information 244 and in-domain destination switch information 243 to the packet 240, for instance, by an MPLS (Multi-Protocol Label Switching) (L2-VPN (Layer 2 Virtual Private Network)) push action, according to the determined action. Then the switch (1) 204 outputs the converted packet as a packet 241 to a switch (4) 207 according to the determined action.

The global user information 245 of the packet 241 is obtained by converting the VLAN_ID (Virtual Local Area Network Identifier) (12 bits) used locally for identifying users into QinQ (24 bits) information for identifying users in the network. Further, the destination switch information 244 is Shim header information indicating a switch (7) 210. Furthermore, the in-domain destination switch information 243 is Outer_Dst MAC information indicating the switch (7) 210.

In the in-domain communication, the destination switch information 244 and the in-domain destination switch information 243 has the information of the switch (7) 210 in the same domain (1) 201.

The switch (4) 207 receives the packet 241 from the switch (1) 204. The switch (4) 207 refers to the in-domain destination switch information 243 of the packet 241 in a database held by the switch (4) 207 and determines an action.

According to the determined action, the switch (4) 207 outputs the packet 241 to the switch (7) 210. At this time, the format of the packet 241 is the same as that of the packet 241 received by the switch (4) 207. In other words, packets are relayed without changing the format in the in-domain communication.

The switch (7) 210 receives the packet 241 from the switch (4) 207. The switch (7) 210 refers to the destination switch information 244/the destination terminal information 237/the global user information 245 of the packet 241 in a database held by the switch (7) 210 and determines an action.

The switch (7) 210 converts the global user information 245 of the packet 241 into the local user information 238, for instance, by QinQ conversion, according to the determined action. Further, the switch (7) 210 deletes the destination switch information 244 and the in-domain destination switch information 243 from the packet 241, for instance, by an MPLS (L2-VPN) pop action, according to the determined action. Then the switch (7) 210 outputs the converted packet as a packet 242 to a terminal (a-3) 233 according to the determined action.

Note that the local user information 238 of the packet 242 does not have to be the same as the local user information 238 of the packet 240. For instance, the local user information 238 corresponding to the global user information 245 may be different for each switch.

Figure 9:
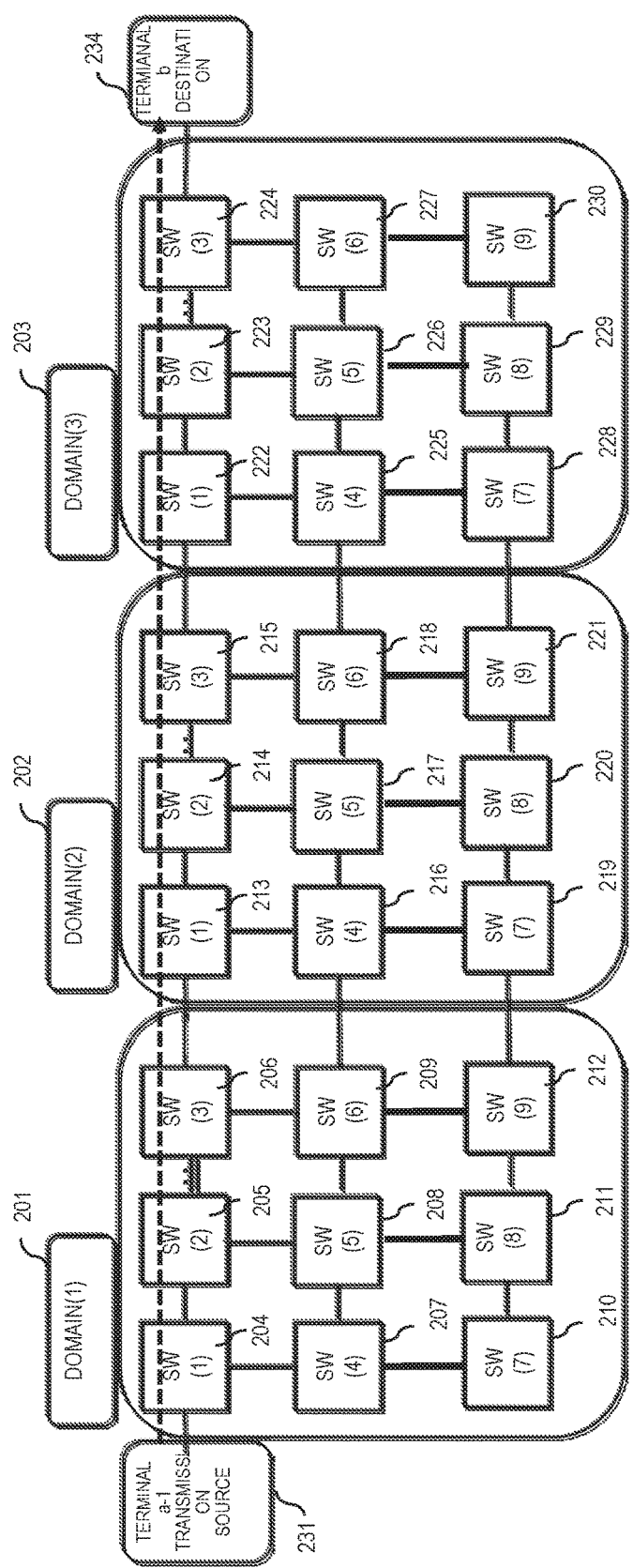
FIG. 9 is a drawing for explaining communication between domains in the communication system relating to the second exemplary embodiment.
Figure 10:
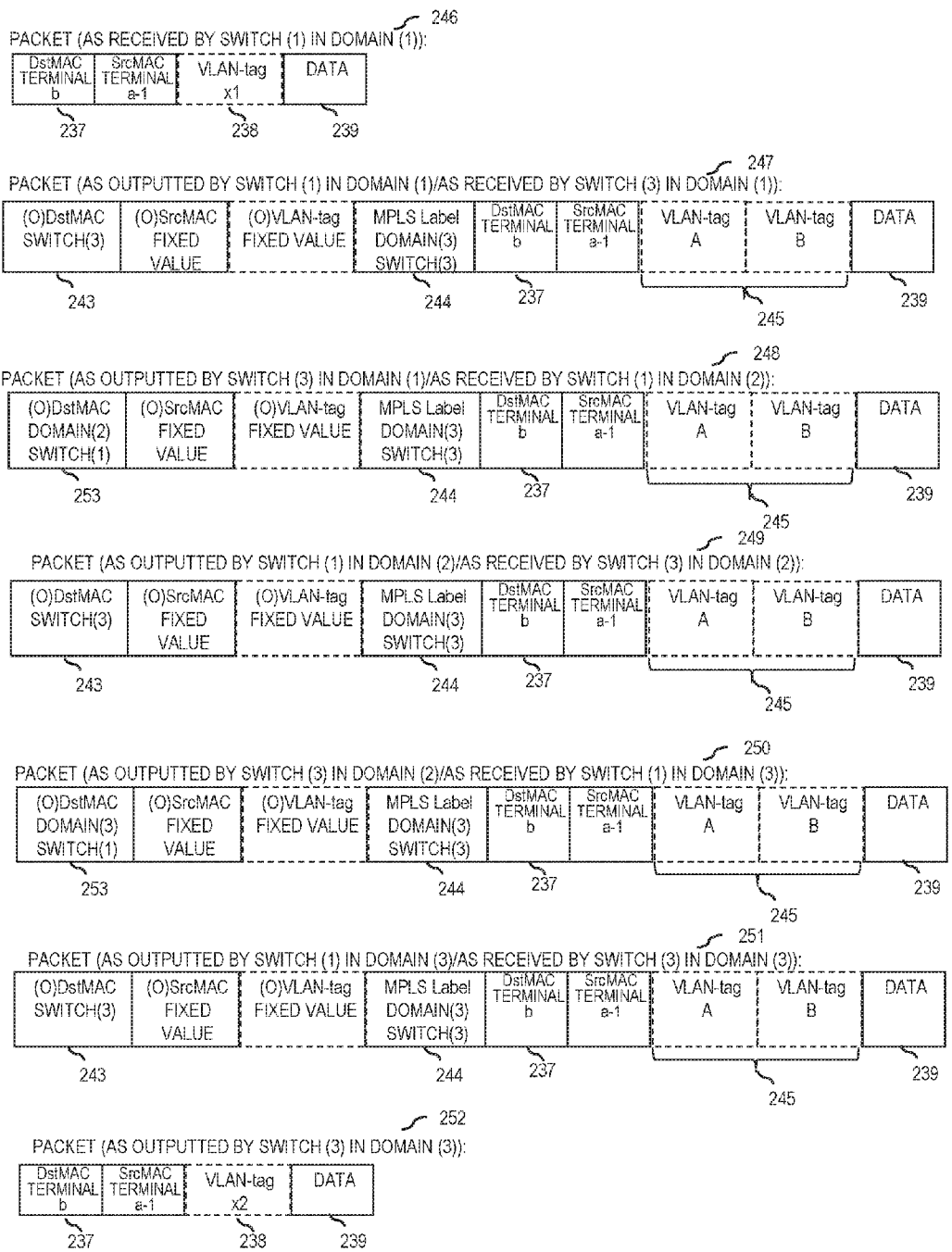
FIG. 10 is a drawing for explaining communication between domains in the communication system relating to the second exemplary embodiment.

FIGS. 9 and 10 are drawings for explaining an example of packet relay operation in the inter-domain communication.

In FIG. 9, the switch (1) 204 receives a packet 246 from the terminal (a-1) 231. The switch (1) 204 refers to the destination terminal information 237/the local user information 238 of the packet 246 in the database held by the switch (1) 204 and determines an action.

In FIG. 10, the switch (1) 204 converts the local user information 238 of the packet 246 into the global user information 245, for instance, by QinQ conversion, according to the determined action. Further, the switch (1) 204 gives the destination switch information 244 and the in-domain destination switch information 243 to the packet 246, for instance, by an MPLS (L2-VPN) push action, according to the determined action. Then the switch (1) 204 outputs the converted packet as a packet 247 to a switch (2) 205 according to the determined action.

The switch (2) 205 receives the packet 247 from the switch (1) 204. The switch (2) 205 refers to the in-domain destination switch information 243 of the packet 247 in a database held by the switch (2) 205 and determines an action.

According to the determined action, the switch (2) 205 outputs the packet 247 to a switch (3) 206. At this time, the format of the packet 247 is the same as that of the packet 247 received by the switch (2) 205. In other words, packets are relayed with the format unchanged in the in-domain communication.

The switch (3) 206 receives the packet 247 from the switch (2) 205. The switch (3) 206 refers to the destination switch information 244 of the packet 247 in a database held by the switch (3) 206 and determines an action.

The switch (3) 206 converts the in-domain destination switch information 243 of the packet 247 into domain boundary destination switch information 253 by rewriting the Dst MAC according to the determined action. The switch (3) 206 outputs the converted packet as a packet 248 to a switch (1) 213 according to the determined action.

The switch (1) 213 receives the packet 248 from the switch (3) 206. The switch (1) 213 refers to the destination switch information 244 of the packet 248 in a database held by the switch (1) 213 and determines an action.

The switch (1) 213 converts the domain boundary destination switch information 253 into the in-domain destination switch information 243 by rewriting the Dst MAC of the packet 248 according to the determined action. Further, the switch (1) 213 outputs the converted packet as a packet 249 to a switch (2) 214 according to the determined action.

The switch (2) 214 receives the packet 249 from the switch (1) 213. The switch (2) 214 refers to the in-domain destination switch information 243 of the packet 249 in a database held by the switch (2) 214 and determines an action.

According to the determined action, the switch (2) 214 outputs the packet 249 to a switch (3) 215. At this time, the format of the packet 249 is the same as that of the packet 249 received by the switch (2) 214. In other words, packets are relayed with the format unchanged in the in-domain communication.

The switch (3) 215 receives the packet 249 from the switch (2) 214. The switch (3) 215 refers to the destination switch information 244 of the packet 249 in a database held by the switch (3) 215 and determines an action.

The switch (3) 215 converts the in-domain destination switch information 243 of the packet 249 into the domain boundary destination switch information 253 by rewriting the Dst MAC according to the determined action. The switch (3) 215 outputs the converted packet as a packet 250 to a switch (1) 222 according to the determined action.

The switch (1) 222 receives the packet 250 from the switch (3) 215. The switch (1) 222 refers to the destination switch information 244 of the packet 250 in a database held by the switch (1) 222 and determines an action.

The switch (1) 222 converts the domain boundary destination switch information 253 of the packet 250 into the in-domain destination switch information 243 by rewriting the Dst MAC according to the determined action. Further, the switch (1) 222 outputs the converted packet as a packet 251 to a switch (2) 223 according to the determined action.

The switch (2) 223 receives the packet 251 from the switch (1) 222. The switch (2) 223 refers to the in-domain destination switch information 243 of the packet 251 in a database held by the switch (2) 223 and determines an action.

According to the determined action, the switch (2) 223 outputs the packet 251 to a switch (3) 224. At this time, the format of the packet 251 is the same as that of the packet 251 received by the switch (2) 223. In other words, packets are relayed with the format unchanged in the in-domain communication.

The switch (3) 224 receives the packet 251 from the switch (2) 223. The switch (3) 224 refers to the destination switch information 244/the destination terminal information 237/the global user information 245 of the packet 251 in a database held by the switch (3) 224 and determines an action.

The switch (3) 224 converts the global user information 245 of the packet 251 into the local user information 238, for instance, by QinQ conversion, according to the determined action. Further, the switch (3) 224 deletes the destination switch information 244 and the in-domain destination switch information 243 from the packet 251, for instance, by an MPLS (L2-VPN) pop action, according to the determined action. Then the switch (3) 224 outputs the converted packet as a packet 252 to a terminal b234 according to the determined action.

Note that the local user information 238 of the packet 242 does not have to be the same as that of the packet 240. For instance, the local user information 238 corresponding to the global user information 245 may be different for each switch.

In the operations illustrated in FIGS. 7 to 10, QinQ is used for converting between the local user information 238 and the global user information 245, and MPLS (L2-VPN) push and pop actions are used for giving/deleting the destination switch information 244 and the in-domain destination switch information 243. These functions, however, are not necessarily required for achieving the operation of the present exemplary embodiment. If equivalent operations can be achieved, different functions can be used. For instance, VXLAN (Virtual extensible Local Area Network) may be used instead of MPLS (L2-VPN).

In the communication system of the present exemplary embodiment, communication is identified with a combination of "the destination terminal information 237 and the local user information 238" or "the destination terminal information 237 and the global user information 245" only at the entrance and the exit of the network in any of the examples shown in FIGS. 7 to 10. For instance, communication with {VLAN: 1/Dst MAC: A} and communication with {VLAN: 2/Dst MAC: A} are identified as separate pieces of communication.

Further, in the communication system of the present exemplary embodiment, the packet relay operation is performed inside the network using only the in-domain destination switch information 243 and the destination switch information 244. At this time, for instance, communication addressed to a switch X in a virtual network 1 and communication addressed to the switch X in a virtual network 2 can be managed together.

In other words, according to the communication system of the present exemplary embodiment, the resource consumption of relay switches can be reduced by managing communication while virtually dividing a network, and collectively managing the relay operation of the plurality of virtual networks inside the network.

Further, according to the communication system of the present exemplary embodiment, the number of users greater than the accommodation conditions of a single switch can be accommodated by the entire network by converting between the local user information 238 and the global user information 245 at the entrance and the exit of the network. For instance, where the number of pieces of the local user information 238 (=the number of VLANs) accommodated by a switch is 4 k, the number of pieces of the global user information 245 (=the number of QinQs) accommodated by the entire network can be 4 k×4 k.

(Third Exemplary Embodiment)

Next, a communication system relating to a third exemplary embodiment will be described with reference to the drawings. In the second exemplary embodiment (FIGS. 7 to 10), a case of L2 (Layer 2) relay in a virtual network was described. In the present exemplary embodiment, a case where L3 (Layer 3) relay is performed in a virtual network will be described. Note that the information required to relay packets has been notified to the switch group 101 by the controller group 102 and the host controller 103 in the present exemplary embodiment as well.

Figure 11:
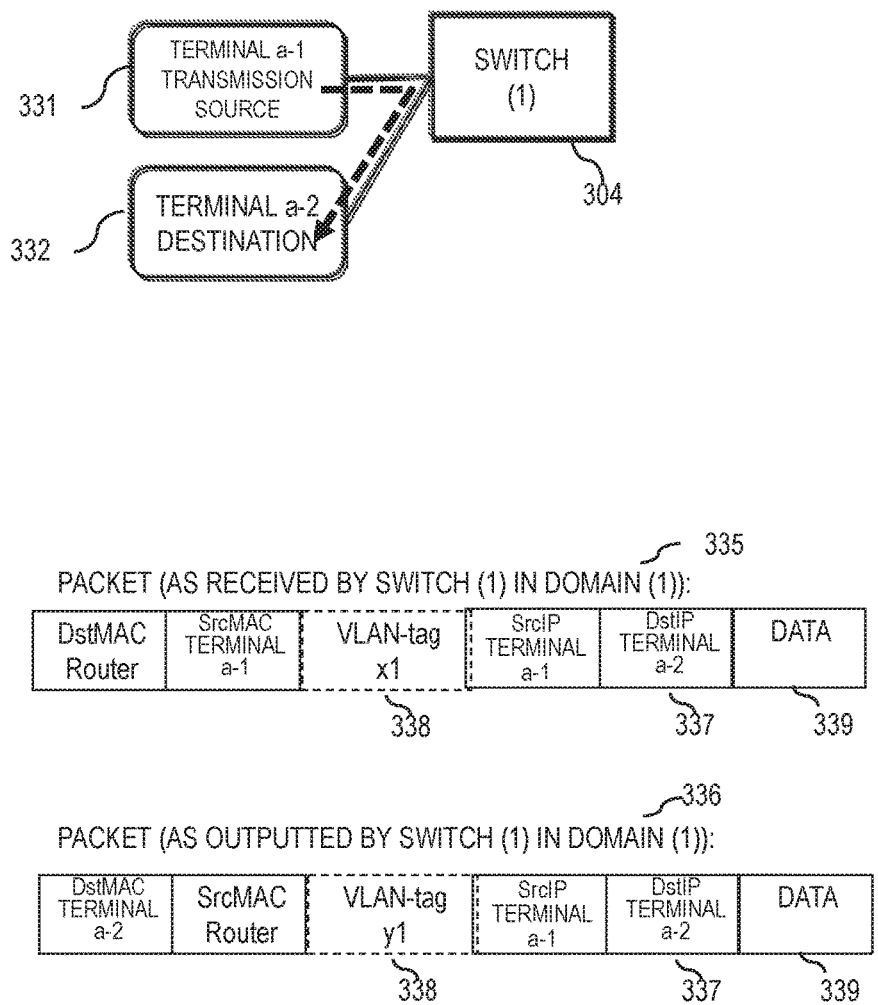
FIG. 11 is a drawing for explaining communication within a switch in a communication system relating to a third exemplary embodiment.

FIG. 11 is a drawing illustrating a packet relay operation in the in-switch communication.

In FIG. 11, a switch (1) 304 receives a packet 335 from a terminal (a-1) 331. The switch (1) 304 refers to destination terminal information 337/local user information 338 of the packet 335 in a database held by the switch (1) 304 and determines an action.

The destination terminal information 337 of the packet 335 is Dst IP address information indicating a terminal (a-2) 332. Further, the local user information 338 is the information of a VLAN_ID to which the terminal (a-1) 331 belongs. Moreover, data 339 is the actual data exchanged in the communication.

Note that a distinction between L2 (Layer 2) and L3 (Layer 3) communication is whether or not the Dst MAC of the packet 335 is information indicating a router for IP (Internet Protocol) routing.

The switch (1) 304 converts the format of the packet 335 into pseudo-L2 information so that it looks as if IP routing has been performed. In other words, the switch (1) 304 converts the Dst MAC into the information of the terminal (a-2) 332, the Src MAC into information indicating a router for IP routing, and the VLAN_ID into information to which the terminal (a-2) 332 belongs, respectively. Further, the switch (1) 304 outputs the converted packet as a packet 336 to the terminal (a-2) 332 according to the determined action.

Figure 12:
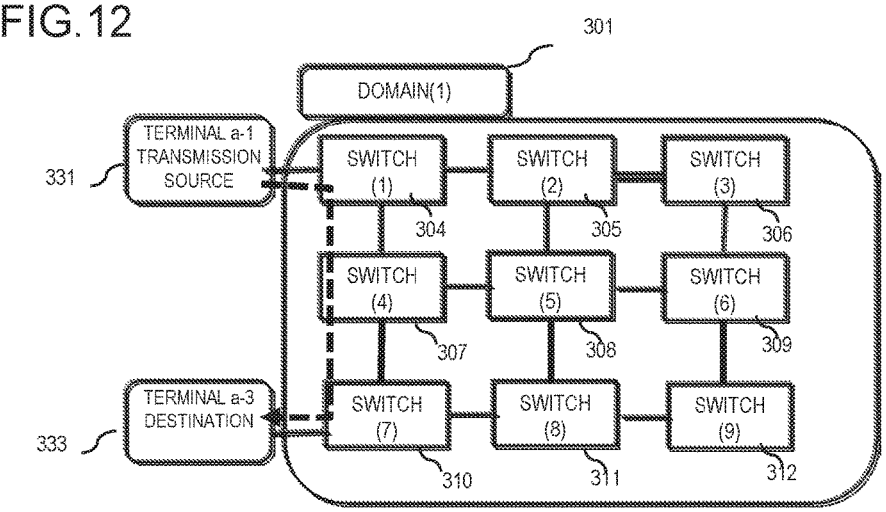
FIG. 12 is a drawing for explaining communication within a domain in the communication system relating to the third exemplary embodiment.

FIG. 12 is a drawing illustrating an example of packet relay operation in the in-domain communication.

The switch (1) 304 receives a packet 340 from the terminal (a-1) 331. The switch (1) 304 refers to the destination terminal information 337/the local user information 338 of the packet 340 in the database held by the switch (1) 304 and determines an action.

The switch (1) 304 converts the local user information 338 of the packet 340 into global user information 345, for instance, by QinQ conversion, according to the determined action. Further, the switch (1) 304 gives destination switch information 344 and in-domain destination switch information 343 to the packet 340, for instance, by an MPLS (L3-VPN) push action, according to the determined action. Moreover, the switch (1) 304 outputs the converted packet as a packet 341 to a switch (4) 307 according to the determined action.

The global user information 345 of the packet 341 is obtained by converting the VLAN_ID (12 bits) used locally for identifying users into QinQ (24 bits) information for identifying users in the network. Further, the destination switch information 344 is Shim header information indicating a switch (7) 310. Furthermore, the in-domain destination switch information 343 is Outer_Dst MAC information indicating the switch (7) 310.

In the in-domain communication, the destination switch information 344 and the in-domain destination switch information 343 has the information of the switch (7) 310 in the same domain (1) 301.

The switch (4) 307 receives the packet 341 from the switch (1) 304. The switch (4) 307 refers to the in-domain destination switch information 343 of the packet 341 in a database held by the switch (4) 307 and determines an action.

According to the determined action, the switch (4) 307 outputs the packet 341 to the switch (7) 310. At this time, the format of the packet 341 is the same as that of the packet 341 received by the switch (4) 307. In other words, packets are relayed without changing the format in the in-domain communication.

The switch (7) 310 receives the packet 341 from the switch (4) 307. The switch (7) 310 refers to the destination switch information 344/the destination terminal information 337/the global user information 345 of the packet 341 in a database held by the switch (7) 310 and determines an action.

The switch (7) 310 deletes the destination switch information 344 from the packet 341, for instance, by an MPLS (L3-VPN) pop action, according to the determined action. Further, the switch (7) 310 converts the format of the packet 341 into pseudo-L2 information so that it looks as if IP routing has been performed. In other words, the switch (7) 310 converts the Dst MAC into the information of a terminal (a-3) 333, the Src MAC into information indicating a router for IP routing, and the VLAN_ID into information to which the terminal (a-3) 333 belongs, respectively. The switch (7) 310 outputs the converted packet as a packet 342 to the terminal (a-3) 333 according to the determined action.

Figure 13:
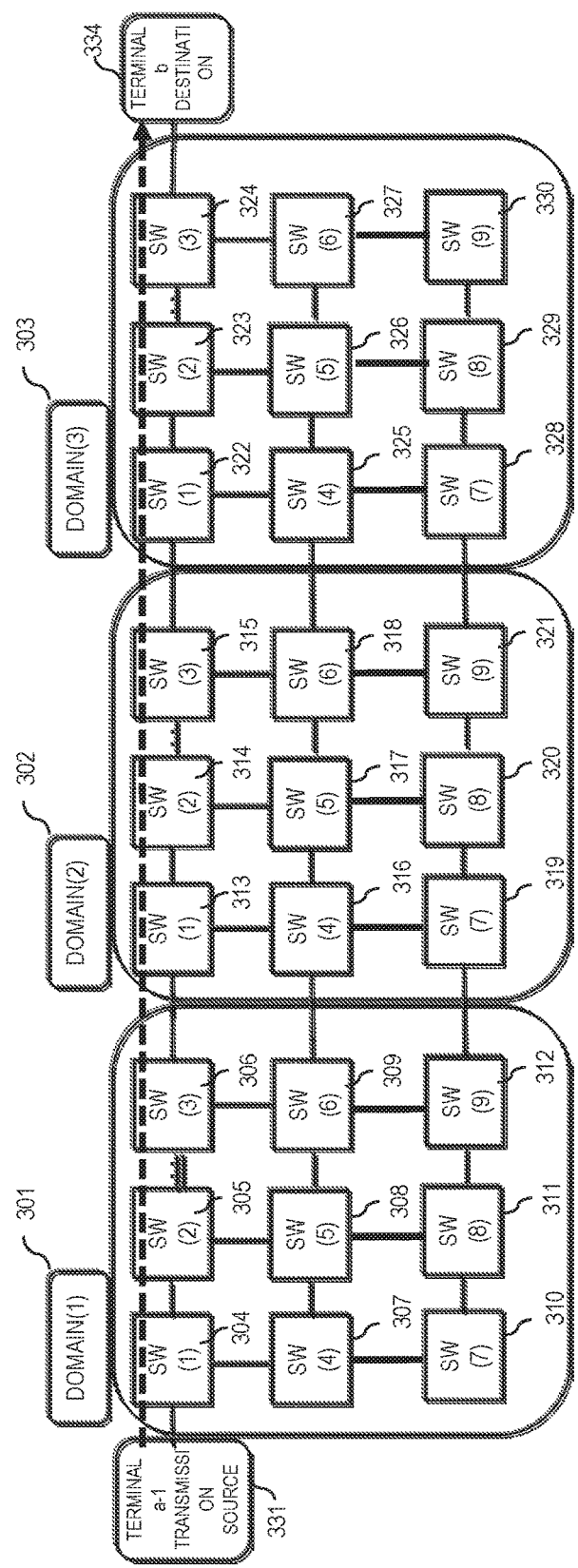
FIG. 13 is a drawing for explaining communication between domains in the communication system relating to the third exemplary embodiment.

FIGS. 13 and 14 are drawings illustrating an example of packet relay operation in the inter-domain communication.

In FIG. 13, the switch (1) 304 receives a packet 346 from the terminal (a-1) 331. The switch (1) 304 refers to the destination terminal information 337/the local user information 338 of the packet 346 in the database held by the switch (1) 304 and determines an action.

In FIG. 14, the switch (1) 304 converts the local user information 338 of the packet 346 into the global user information 345, for instance, by QinQ conversion, according to the determined action. Further, the switch (1) 304 gives the destination switch information 344 and the in-domain destination switch information 343 to the packet 346, for instance, by an MPLS (L3-VPN) push action, according to the determined action. Then the switch (1) 304 outputs the converted packet as a packet 347 to a switch (2) 305 according to the determined action.

The switch (2) 305 receives the packet 347 from the switch (1) 304. The switch (2) 305 refers to the in-domain destination switch information 343 of the packet 347 in a database held by the switch (2) 305 and determines an action.

According to the determined action, the switch (2) 305 outputs the packet 347 to a switch (3) 306. At this time, the format of the packet 347 is the same as that of the packet 347 received by the switch (2) 305. In other words, packets are relayed without changing the format in the in-domain communication.

The switch (3) 306 receives the packet 347 from the switch (2) 305. The switch (3) 306 refers to the destination switch information 344 of the packet 347 in a database held by the switch (3) 306 and determines an action.

The switch (3) 306 converts the in-domain destination switch information 343 of the packet 347 into domain boundary destination switch information 353, for instance, by rewriting the Dst MAC according to the determined action. Then the switch (3) 306 outputs the converted packet as a packet 348 to a switch (1) 313 according to the determined action.

The switch (1) 313 receives the packet 348 from the switch (3) 306. The switch (1) 313 refers to the destination switch information 344 of the packet 348 in a database held by the switch (1) 313 and determines an action.

The switch (1) 313 converts the domain boundary destination switch information 353 of the packet 348 into the in-domain destination switch information 343 by rewriting the Dst MAC of the packet 248 according to the determined action. Further, the switch (1) 313 outputs the converted packet as a packet 349 to a switch (2) 314 according to the determined action.

The switch (2) 314 receives the packet 349 from the switch (1) 313. The switch (2) 314 refers to the in-domain destination switch information 343 of the packet 349 in a database held by the switch (2) 314 and determines an action.

According to the determined action, the switch (2) 314 outputs the packet 349 to a switch (3) 315. At this time, the format of the packet 349 is the same as that of the packet 349 received by the switch (2) 314. In other words, packets are relayed with the format unchanged in the in-domain communication.

The switch (3) 315 receives the packet 349 from the switch (2) 314. The switch (3) 315 refers to the destination switch information 344 of the packet 349 in a database held by the switch (3) 315 and determines an action.

The switch (3) 315 converts the in-domain destination switch information 343 of the packet 349 into the domain boundary destination switch information 353 by rewriting the Dst MAC according to the determined action. The switch (3) 315 outputs the converted packet as a packet 350 to a switch (1) 322 according to the determined action.

The switch (1) 322 receives the packet 350 from the switch (3) 315. The switch (1) 322 refers to the destination switch information 344 of the packet 350 in a database held by the switch (1) 322 and determines an action.

The switch (1) 322 converts the domain boundary destination switch information 353 of the packet 350 into the in-domain destination switch information 343 by rewriting the Dst MAC according to the determined action. Further, the switch (1) 322 outputs the converted packet as a packet 351 to a switch (2) 323 according to the determined action.

The switch (2) 323 receives the packet 351 from the switch (1) 322. The switch (2) 323 refers to the in-domain destination switch information 343 of the packet 351 in a database held by the switch (2) 323 and determines an action.

According to the determined action, the switch (2) 323 outputs the packet 351 to a switch (3) 324. At this time, the format of the packet 351 is the same as that of the packet 351 received by the switch (2) 323. In other words, packets are relayed with the format unchanged in the in-domain communication.

The switch (3) 324 receives the packet 351 from the switch (2) 323. The switch (3) 324 refers to the destination switch information 344/the destination terminal information 337/the global user information 345 of the packet 351 in a database held by the switch (3) 324 and determines an action.

The switch (3) 324 deletes the destination switch information 344 of the packet 351, for instance, by an MPLS (L3-VPN) pop action, according to the determined action. Further, the switch (3) 324 converts the format of the packet into pseudo-L2 information so that it looks as if IP routing has been performed. In other words, the switch (3) 324 converts the Dst MAC into the information of a terminal b334, the Src MAC into information indicating a router for IP routing, and the VLAN_ID into information to which the terminal b334 belongs, respectively. Further, the switch (3) 324 outputs the converted packet as a packet 352 to the terminal b334 according to the determined action.

In the operations illustrated in FIGS. 11 to 14, QinQ is used for converting between the local user information 338 and the global user information 345, and MPLS (L3-VPN) push and pop actions are used for giving/deleting the destination switch information 344 and the in-domain destination switch information 343. These functions, however, are not necessarily required for achieving the operation of the present exemplary embodiment. If equivalent operations can be achieved, different functions can be used.

In the communication system of the present exemplary embodiment, communication is identified with a combination of "the destination terminal information 337 and the local user information 338" or "the destination terminal information 337 and the global user information 345" only at the entrance and the exit of the network in any of the examples shown in FIGS. 11 to 14. For instance, communication with {VLAN: 1/Dst IP: A} and communication with {VLAN: 2/Dst IP: A} are identified as separate pieces of communication.

Further, in the communication system of the present exemplary embodiment, the packet relay operation is performed inside the network using only the in-domain destination switch information 343 and the destination switch information 344. At this time, for instance, communication addressed to a switch X in a virtual network 1 and communication addressed to the switch X in a virtual network 2 can be managed together.

In other words, according to the communication system of the present exemplary embodiment, the resource consumption of relay switches can be reduced by managing communication while virtually dividing a network, and collectively managing the relay operation of the plurality of virtual networks inside the network.

Further, according to the communication system of the present exemplary embodiment, the number of users greater than the accommodation conditions of a single switch can be accommodated by the entire network by converting between the local user information 338 and the global user information 345 at the entrance and the exit of the network. For instance, where the number of pieces of the local user information 338 (=the number of VLANs) accommodated by a switch is 4 k, the number of pieces of the global user information 345 (=the number of QinQs) accommodated by the entire network can be 4 k×4 k.

Further, the following modes of the present invention are possible.

(Mode 1)
As the communication system relating to the first aspect.

(Mode 2)
The communication system according to mode 1, wherein when a switch that accommodates a transmission source terminal receives a packet from the transmission source terminal in the first communication, the one first control apparatus corresponding to the one domain refers to the first database using information included in the packet identifying a destination terminal and a first identifier with which each switch identifies a user, determines processing content on the packet, and causes the switch based on the determined processing content to add to the packet first information identifying a switch that accommodates the destination terminal and second information identifying a switch corresponding to an exit of the packet in the one domain, and to change the first identifier included in the packet to a second identifier identifying the user in a network including the plurality of switches.

(Mode 3)
The communication system according to mode 2, wherein when a switch, which is not the switch that accommodates the transmission source terminal or a switch that accommodates the destination terminal out of switches on a forwarding path of the packet included in the one domain, receives the packet in the first communication, the one first control apparatus corresponding to the one domain refers to the first database using the second information, determines processing content on the packet, and causes the switch based on the determined processing content to forward the packet.

(Mode 4)
The communication system according to mode 1, wherein when a switch that accommodates a transmission source terminal receives a packet from the transmission source terminal in the second communication, the second control apparatus refers to the second database using information included in the packet identifying a destination terminal and a first identifier with which each switch identifies a user, determines processing content on the packet, and causes the switch based on the determined processing content to add to the packet first information identifying a switch that accommodates the destination terminal and second information identifying a switch corresponding to an exit of the packet in a domain including the switch that accommodates the transmission source terminal, and to change the first identifier included in the packet to a second identifier identifying the user in a network including the plurality of switches.

(Mode 5)
The communication system according to mode 4, wherein when a switch corresponding to an exit of a domain on a forwarding path of the packet receives the packet in the second communication, the second control apparatus refers to the second database using the information identifying the destination terminal, determines processing content on the packet, and causes the switch based on the determined processing content to delete the second information from the packet, and add to the packet third information identifying a switch corresponding to an entrance of another domain adjacent to the domain on the forwarding path.

(Mode 6)
The communication system according to mode 4 or 5, wherein when a switch corresponding to an entrance of a domain on a forwarding path of the packet receives the packet from another domain adjacent to the domain on the forwarding path in the second communication, the second control apparatus refers to the second database using the information identifying the destination terminal, determines processing content on the packet, and causes the switch based on the determined processing content to delete the third information from the packet, and add to the packet information identifying a switch corresponding to an exit of the first domain as the second information.

(Mode 7)
The communication system according to any one of modes 4 to 6, wherein when a switch, which is not a switch corresponding to an entrance of the packet or a switch corresponding to an exit of the packet out of switches on a forwarding path included in a domain on the forwarding path of the packet, receives the packet in the second communication, the first control apparatus corresponding to the domain refers to the first database using the second information, determines processing content on the packet, and causes the switch based on the determined processing content to forward the packet.

(Mode 8)
As the control apparatus relating to the second aspect.

(Mode 9)
As the control apparatus relating to the third aspect.

(Mode 10)
As the communication control method relating to the fourth aspect.

(Mode 11)
The communication control method according to mode 10, comprising:
by a switch that accommodates a transmission source terminal, receiving a packet from the transmission source terminal in the first communication;
by the one first control apparatus corresponding to the one domain, referring to the first database using information included in the packet identifying a destination terminal and a first identifier with which each switch identifies a user, and determining processing content on the packet; and
based on the determined processing content, causing the switch that accommodates the transmission source terminal to add to the packet first information identifying a switch that accommodates the destination terminal and second information identifying a switch corresponding to an exit of the packet in the one domain, and to change the first identifier included in the packet to a second identifier identifying the user in a network including the plurality of switches.

(Mode 12)
The communication control method according to mode 11, comprising:
by a switch, which is not the switch that accommodates the transmission source terminal or a switch that accommodates the destination terminal out of switches on a forwarding path of the packet included in the one domain, receiving the packet in the first communication;
by the one first control apparatus corresponding to the one domain, referring to the first database using the second information, and determining processing content on the packet; and
based on the determined processing content, causing the switch that accommodates the transmission source terminal to forward the packet.

(Mode 13)
The communication control method according to mode 10, comprising:
by a switch that accommodates a transmission source terminal, receiving a packet from the transmission source terminal in the second communication;
by the second control apparatus, referring to the second database using information included in the packet identifying a destination terminal and a first identifier with which each switch identifies a user, and determining processing content on the packet; and
based on the determined processing content, causing the switch that accommodates the transmission source terminal to add to the packet first information identifying a switch that accommodates the destination terminal and second information identifying a switch corresponding to an exit of the packet in a domain including the switch that accommodates the transmission source terminal, and to change the first identifier included in the packet to a second identifier identifying the user in a network including the plurality of switches.

(Mode 14)
The communication control method according to mode 13, comprising:
by a switch corresponding to an exit of a domain on a forwarding path of the packet, receiving the packet in the second communication;
by the second control apparatus, referring to the second database using the information identifying the destination terminal, and determining processing content on the packet; and
based on the determined processing content, causing the switch corresponding to the exit to delete the second information from the packet, and add to the packet third information identifying a switch corresponding to an entrance of another domain adjacent to the domain on the forwarding path.

(Mode 15)
The communication control method according to mode 13 or 14, comprising:
by a switch corresponding to an entrance of a domain on a forwarding path of the packet, receiving the packet from another domain adjacent to the domain on the forwarding path in the second communication;
by the second control apparatus, referring to the second database using the information identifying the destination terminal, and determining processing content on the packet; and
based on the determined processing content, causing the switch corresponding to the entrance to delete the third information from the packet, and add to the packet information identifying a switch corresponding to an exit of the domain as the second information.

(Mode 16)
The communication control method according to any one of modes 13 to 15, comprising:
by a switch, which is not a switch corresponding to an entrance of the packet or a switch corresponding to an exit of the packet out of switches on a forwarding path included in a domain on the forwarding path of the packet, receiving the packet in the second communication;
by the first control apparatus corresponding to the domain on the forwarding path of the packet, referring to the first database using the second information, and determines processing content on the packet; and
based on the determined processing content, causing the switch, which is not the switch corresponding to the entrance or the exit, to forward the packet.

(Mode 17)
As the communication control method relating to the fifth aspect.

(Mode 18)
As the communication control method relating to the sixth aspect.

(Mode 19)
As the program relating to the seventh aspect.

(Mode 20)
As the program relating to the eighth aspect.

Further, the disclosure of each Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a specific numeric value or small range included in these ranges even in cases where no explanation is provided.
101: switch group
102: controller group
103: host (upper-ordinate) controller
104 to 109: domain
110 to 115: controller
116: switch control protocol
117: controller control protocol
118 to 171: switch (SW)
172 to 177: terminal
178, 179, 183 to 185, 189 to 196: packet
180: destination terminal information
181: local user information
182: data
186: in-domain destination switch information
187: destination switch information
188: global user information
197: domain boundary destination switch information
201 to 203: domain
204 to 230: switch (SW)
231 to 234: terminal
235, 236, 240 to 242, 246 to 252: packet
237: destination terminal information
238: local user information
239: data
243: in-domain destination switch information
244: destination switch information
245: global user information
253: domain boundary destination switch information
301 to 303: domain
304 to 330: switch (SW)
331 to 334: terminal
335, 336, 340 to 342, 346 to 352: packet
337: destination terminal information
338: local user information
339: data
343: in-domain destination switch information
344: destination switch information
345: global user information
353: domain boundary destination switch information

The invention claimed is:

1. A communication system, comprising:
a plurality of switches divided into a plurality of domains;
a plurality of first control apparatuses that control a switch(es) included in a corresponding domain out of the plurality of domains; and
a second control apparatus that controls the plurality of first control apparatuses, wherein
one first control apparatus corresponding to one domain out of the plurality of domains determines processing content on a packet of first communication between terminals accommodated by different switches included in the one domain based on a first database held by the one first control apparatus, and
the second control apparatus determines processing content on a packet of second communication between terminals accommodated by switches included in different domains out of the plurality of domains based on a second database held by the second control apparatus.

2. The communication system according to claim 1, wherein
when a switch that accommodates a transmission source terminal receives a packet from the transmission source terminal in the first communication, the one first control apparatus corresponding to the one domain refers to the first database using information included in the packet identifying a destination terminal and a first identifier with which each switch identifies a user, determines processing content on the packet, and causes the switch based on the determined processing content to add to the packet first information identifying a switch that accommodates the destination terminal and second information identifying a switch corresponding to an exit of the packet in the one domain, and to change the first identifier included in the packet to a second identifier identifying the user in a network including the plurality of switches.

3. The communication system according to claim 2, wherein
when a switch, which is not the switch that accommodates the transmission source terminal or a switch that accommodates the destination terminal out of switches on a forwarding path of the packet included in the one domain, receives the packet in the first communication, the one first control apparatus corresponding to the one domain refers to the first database using the second information, determines processing content on the packet, and causes the switch based on the determined processing content to forward the packet.

4. The communication system according to claim 1, wherein
when a switch that accommodates a transmission source terminal receives a packet from the transmission source terminal in the second communication, the second control apparatus refers to the second database using information included in the packet identifying a destination terminal and a first identifier with which each switch identifies a user, determines processing content on the packet, and causes the switch based on the determined processing content to add to the packet first information identifying a switch that accommodates the destination terminal and second information identifying a switch corresponding to an exit of the packet in a domain including the switch that accommodates the transmission source terminal, and to change the first identifier included in the packet to a second identifier identifying the user in a network including the plurality of switches.

5. The communication system according to claim 4, wherein
when a switch corresponding to an exit of a domain on a forwarding path of the packet receives the packet in the second communication, the second control apparatus refers to the second database using the information identifying the destination terminal, determines processing content on the packet, and causes the switch based on the determined processing content to delete the second information from the packet, and add to the packet third information identifying a switch corresponding to an entrance of another domain adjacent to the domain on the forwarding path.

6. The communication system according to claim 4, wherein
when a switch corresponding to an entrance of a domain on a forwarding path of the packet receives the packet from another domain adjacent to the domain on the forwarding path in the second communication, the second control apparatus refers to the second database using the information identifying the destination terminal, determines processing content on the packet, and causes the switch based on the determined processing content to delete the third information from the packet, and add to the packet information identifying a switch corresponding to an exit of the domain as the second information.

7. The communication system according to claim 4, wherein
when a switch, which is not a switch corresponding to an entrance of the packet or a switch corresponding to an exit of the packet out of switches on a forwarding path included in a domain on the forwarding path of the packet, receives the packet in the second communication, the first control apparatus corresponding to the domain refers to the first database using the second information, determines processing content on the packet, and causes the switch based on the determined processing content to forward the packet.

8. A control apparatus corresponding to one of a plurality of first control apparatuses in a communication system comprising a plurality of switches divided into a plurality of domains, the plurality of first control apparatuses, and a second control apparatus, wherein:
the plurality of first control apparatuses control a switch(es) included in a corresponding domain out of the plurality of domains,
the second control apparatus controls the plurality of first control apparatuses,
the one first control apparatus determines processing content on a packet of first communication between terminals accommodated by different switches included in one domain corresponding to the one first control apparatus based on a first database held by the one first control apparatus, and
the second control apparatus determines processing content on a packet of second communication between terminals accommodated by switches included in different domains out of the plurality of domains based on a second database held by the second control apparatus.

9. A second control apparatus provided in a communication system comprising a plurality of switches divided into a plurality of domains, and a plurality of first control apparatuses, wherein:
the plurality of first control apparatuses control a switch(es) included in a corresponding domain out of the plurality of domains,
the second control apparatus controls the plurality of first control apparatuses,
one first control apparatus corresponding to one domain out of the plurality of domains determines processing content on a packet of first communication between terminals accommodated by different switches included in the one domain based on a first database held by the one first control apparatus, and
the second control apparatus determines processing content on a packet of second communication between terminals accommodated by switches included in different domains out of the plurality of domains based on a second database held by the second control apparatus.

10. A communication control method in a communication system comprising a plurality of switches divided into a plurality of domains, a plurality of first control apparatuses, and a second control apparatus, the communication control method comprising:
by the plurality of first control apparatuses, controlling a switch(es) included in a corresponding domain out of the plurality of domains;
by the second control apparatus, controlling the plurality of first control apparatuses;
by one first control apparatus corresponding to one domain out of the plurality of domains, determining processing content on a packet of first communication between terminals accommodated by different switches included in the one domain based on a first database held by the one first control apparatus; and
by the second control apparatus, determining processing content on a packet of second communication between terminals accommodated by switches included in different domains out of the plurality of domains based on a second database held by the second control apparatus.

* * * * *